United States Patent
Ito et al.

(10) Patent No.: US 7,130,976 B2
(45) Date of Patent: Oct. 31, 2006

(54) REMOTE COPY METHOD AND REMOTE COPY SYSTEM TO ELIMINATE USE OF EXCESS VOLUME FOR COPYING DATA

(75) Inventors: Ryusuke Ito, Odawara (JP); Yusuke Hirakawa, Odawara (JP); Yoshihiro Asaka, Odawara (JP); Takeshi Kaga, Odawara (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 10/871,341

(22) Filed: Jun. 18, 2004

(65) Prior Publication Data

US 2005/0235121 A1   Oct. 20, 2005

(30) Foreign Application Priority Data

Apr. 19, 2004   (JP)   ............................ P2004-122431

(51) Int. Cl.
G06F 12/00   (2006.01)
(52) U.S. Cl. .................. 711/162; 711/100; 711/161; 711/165
(58) Field of Classification Search .................. None
See application file for complete search history.

(56) References Cited

U.S. PATENT DOCUMENTS

| | | | |
|---|---|---|---|
| 6,209,002 B1 | 3/2001 | Gagne et al. | |
| 6,446,176 B1 | 9/2002 | West et al. | |
| 6,535,967 B1 | 3/2003 | Milillo et al. | |
| 6,654,752 B1 | 11/2003 | Ofek | |
| 6,754,792 B1 | 6/2004 | Nakamura et al. | |
| 2001/0042222 A1 | 11/2001 | Kedem et al. | |
| 2002/0016827 A1 | 2/2002 | McCabe et al. | |
| 2002/0103980 A1 | 8/2002 | Crockette et al. | |
| 2002/0133511 A1 | 9/2002 | Hostetter et al. | |
| 2003/0051111 A1 | 3/2003 | Nakano et al. | |
| 2003/0115433 A1 | 6/2003 | Kodama | |
| 2003/0126107 A1 | 7/2003 | Yamagami | |
| 2003/0188114 A1 | 10/2003 | Lubber et al. | |
| 2003/0188233 A1 | 10/2003 | Lubbers et al. | |
| 2004/0024808 A1 | 2/2004 | Taguchi et al. | |
| 2004/0024975 A1 | 2/2004 | Morishita et al. | |

(Continued)

FOREIGN PATENT DOCUMENTS

WO   WO 02/21273 A1   3/2002

*Primary Examiner*—Mano Padmanabhan
*Assistant Examiner*—Jasmine Song
(74) *Attorney, Agent, or Firm*—Townsend and Townsend and Crew LLP

(57) ABSTRACT

In a configuration in which it is necessary to transfer data from a first storage system to a third storage system through a storage system between the storage systems, there is a problem that it is inevitable to give an excess logical volume to a second storage system between the storage systems. A remote copy system includes first storage system that sends and receives data to and from an information processing apparatus, a second storage system, and a third storage system. The second storage system virtually has a second storage area in which the data should be written and has a third storage area in which the data written in the second storage area and update information concerning the data are written. Data sent from the first storage system is not written in the second storage area but is written in the third storage area as data and update information. The data and the update information written in the third storage area are read out from the third storage system.

9 Claims, 19 Drawing Sheets

U.S. PATENT DOCUMENTS

| | | |
|---|---|---|
| 2004/0034808 A1 | 2/2004 | Day et al. |
| 2004/0148443 A1 | 7/2004 | Achiwa |
| 2004/0153719 A1 | 8/2004 | Achiwa et al. |
| 2004/0172509 A1 | 9/2004 | Takeda et al. |
| 2004/0172510 A1 | 9/2004 | Nagashima et al. |
| 2004/0193795 A1 | 9/2004 | Takeda et al. |
| 2004/0215878 A1 | 10/2004 | Takata et al. |
| 2004/0230756 A1 | 11/2004 | Achiwa et al. |
| 2004/0230859 A1 | 11/2004 | Cochrane et al. |
| 2005/0154845 A1* | 7/2005 | Shackelford et al. ....... 711/162 |

* cited by examiner

VOLUME INFORMATION TABLE 400

| LOGICAL VOLUME NUMBER | VOLUME STATE | FORMAT | CAPACITY | PAIR NUMBER | PHYSICAL ADDRESS | |
|---|---|---|---|---|---|---|
| | | | | | STORAGE NUMBER | POSITION FROM TOP |
| 1 | PRIMARY | OPEN 3 | 6 | 1 | 1 | 0 |
| 2 | SECONDARY | OPEN 3 | 6 | 1 | 2 | 3 |
| 3 | NORMAL | OPEN 3 | 3 | — | 2 | 9 |
| 4 | NORMAL | OPEN 3 | 3 | — | 3 | 0 |
| 5 | NORMAL | OPEN 3 | 6 | — | 3 | 9 |
| 6 | NOT USED | OPEN 6 | 6 | — | 1 | 12 |

FIG. 6

PAIR SETTING INFORMATION TABLE 500

| PAIR NUMBER | PAIR STATE | PRIMARY LOGICAL VOLUME NUMBER | SECONDARY LOGICAL VOLUME NUMBER |
|---|---|---|---|
| 1 | NORMAL | 1 | 2 |
| 2 | NORMAL | 2 | 5 |
| 3 | NOT USED | 0 | 0 |
| 4 | NOT USED | 0 | 0 |
| 5 | NOT USED | 0 | 0 |

FIG. 7

JOURNAL GROUP SETTING INFORMATION TABLE 550

| JOURNAL GROUP NUMBER | PAIR STATE | SOURCE VOLUME NUMBER | JOURNAL VOLUME NUMBER |
|---|---|---|---|
| 1 | NORMAL | 2 (Data1) | 3 (JNL1) |
| 2 | NORMAL | 5 (Data2) | 4 (JNL2) |

PAIR SETTING INFORMATION TABLE 510

| PAIR NUMBER | PAIR STATE | PRIMARY LOGICAL VOLUME NUMBER | SECONDARY LOGICAL VOLUME NUMBER | VIRTUALIZATION |
|---|---|---|---|---|
| 1 | NORMAL | 1 | 2 | ON |
| 2 | NORMAL | 2 | 5 | |
| 3 | NOT USED | 0 | 0 | |
| 4 | NOT USED | 0 | 0 | |
| 5 | NOT USED | 0 | 0 | |

FIG. 20

CONNECTION INFORMATION TABLE 5000

| CHANNEL CONNECTOR | HOST SYSTEM |
|---|---|
| CHANNEL ADAPTER 56 | FIRST STORAGE SYSTEM 10 |
| CHANNEL ADAPTER 57 | HOST COMPUTER 6 |
| CHANNEL ADAPTER 58 | THIRD STORAGE SYSTEM 20 |

FIG. 21

CONNECTION INFORMATION SETTING SECTION 4400 4700

LOGICAL VOLUME USAGE SETTING SECTION 4500 4800

4000

| CHANNEL CONNECTOR | HOST SYSTEM |
|---|---|
| CHANNEL ADAPTER 56 | FIRST STORAGE SYSTEM 10 |
| CHANNEL ADAPTER 57 | HOST COMPUTER 6 |
| CHANNEL ADAPTER 58 | THIRD STORAGE SYSTEM 20 |

| HOST SYSTEM | LOGICAL VOL |
|---|---|
| HOST 5 | 110 |
| HOST 6 | 150 |

| 1ST /S/N | 2ND S/N | VIRTUAL VOL DESIGNATION | YES ☒ |
|---|---|---|---|
| VOL #1 | VOL #2 | | NO ☐ |

4100 PAIR FORMING SECTION

4300 VIRTUAL SETTING SECTION

4600

REMOTE COPY METHOD AND REMOTE COPY SYSTEM TO ELIMINATE USE OF EXCESS VOLUME FOR COPYING DATA

CROSS-REFERENCES TO RELATED APPLICATIONS

This application relates to and claims priority from Japanese Patent Application No. 2004-122431, filed on Apr. 19, 2004, the entire disclosure of which is incorporated herein by reference.

BACKGROUND OF THE INVENTION

1. Field of the Invention

The present invention relates to a storage system, and in particular to copying of data among plural storage systems.

2. Description of the Related Art

In recent years, a technique has grown in importance in which, in order to allow a data processing system to provide services even if a failure has occurred in a storage system used for providing continuous services to customers (hereinafter referred to as first storage system), other storage systems (a storage system a relatively short distance apart from the first storage system is referred to as a second storage system, and a storage system a longer distance apart from the second storage system is referred to as a third storage system) are set separately from the first storage system, and copies of data in the first storage system are stored in the other storage systems. As a technique for copying information stored in the first storage system to the second and the third storage systems, there are techniques disclosed in U.S. Pat. No. 6,209,002 and JP-A-2003-122509.

U.S. Pat. No. 6,209,002 discloses a technique in which the second storage system has two copied data corresponding to copy object data in the first storage system, and the third storage system holds one of the copied data.

JP-A-2003-122509 discloses a technique in which the second storage system has only one copied data corresponding to copy object data in the first storage system, and the third storage system can obtain the copied data without requiring a redundant logical volume for carrying out remote copy as described in U.S. Pat. No. 6,209,002.

As described above, in the conventional techniques, the second storage system is provided between the first storage system and the third storage system, which is located a long distance apart from the first storage system, to realize long-distance remote copy while preventing data loss such that a copy of data in the first storage system is obtained in the third storage system.

However, some users may require a remote copy system in which cost for system operation is considered while failure resistance of data is increased through long-distance copying. For example, a copy of data in the first storage system only has to be held in a storage system located a long distance apart from the first storage system.

In order to give a complete copy of data in the first storage system to the third storage system, which is located a long distance apart from the first storage system, in preparation for a failure, when influence on performance of the first storage system is taken into account, it is necessary to arrange the second storage system between the first storage system and the third storage system and transfer the data from the first storage system to the third storage system through this second storage system. In such a case, it is desired to minimize a logical volume that is used in the second storage system as much as possible.

However, in the case in which it is attempted to remotely copy data from the second storage system to the third storage system located a long distance apart from the second storage system, the second storage system is required to have a volume (copied volume) that is the same as a volume of the first storage system. This volume increases as a capacity of the volume of the first storage system increases.

It is needless to mention that, even if the technique disclosed in JP-A-2003-122509 is applied, the second storage system inevitably has the volume with the same capacity as copy object volume in the first storage system.

SUMMARY OF THE INVENTION

The present invention has been devised in view of such problems, and it is an object of the present invention to minimize or eliminate use of a volume in a second storage system for copying data when the data is copied from a first site to a third site. In addition, it is another object of the present invention to increase availability of a volume such that plural host apparatuses can set an area of the volume as an object of writing.

In order to attain the above-mentioned objects, a form of the present invention has a constitution described below.

A remote copy system includes: a first storage system that sends and receives data to and from a first information processing apparatus; a second storage system that is connected to a second information processing apparatus and the first storage system and receives data from the first storage system; and a third storage system that is connected to the second storage system and receives data from the second storage system. In the remote copy system, the first storage system has a first storage area in which data from an information processing apparatus is written, the second storage system has a logical address for storing a copy of the data but does not have an allocated storage area, and has a second storage area in which the data and update information thereof are written, the data sent from the first storage system is written in the second storage area as the data and the update information, the third storage system has a third storage area in which data read out from the second storage area in the second storage system and update information concerning the data are stored, and the data and the update information stored in the second storage area are read out from the third storage system. The second storage system has a logical address for storing a copy of the data but does not have an allocated storage area, and the storage area has a structure that can be used for transmission and reception of data to and from a second information processing apparatus.

According to the present invention, a copy object data can be copied to the third storage system without requiring the second storage system to have a complete copy of the copy object data in the first storage system. Consequently, a volume capacity in the second storage system can be reduced. In addition, an actual volume, which is not required to be assigned, can be used for another application. Further, a specific area of a volume can be used by plural host apparatuses. The host apparatus in this context means an information processing apparatus that issues instructions for writing data in and reading data from the specific area of the volume. When writing of data in the volume of the second storage system is executed by a writing command issued from the first storage system, the first storage system is a host apparatus for the second storage system. It is needless to mention that an information processing apparatus such as a server can be a host apparatus for a storage system.

BRIEF DESCRIPTION OF THE DRAWINGS

In the accompanying drawings:

FIG. 6 is a diagram showing pair setting information;

FIG. 7 is a diagram showing a journal group setting information table;

FIG. 20 is a diagram showing a connection information table;

FIG. 21 is a diagram showing an example of a setting screen for pair generation that is displayed on a host computer or a maintenance terminal in a fourth embodiment of the present invention;

DESCRIPTION OF THE PREFERRED EMBODIMENTS

Embodiments of the present invention will be hereinafter described with reference to the accompanying drawings.

First Embodiment

Figure 1:
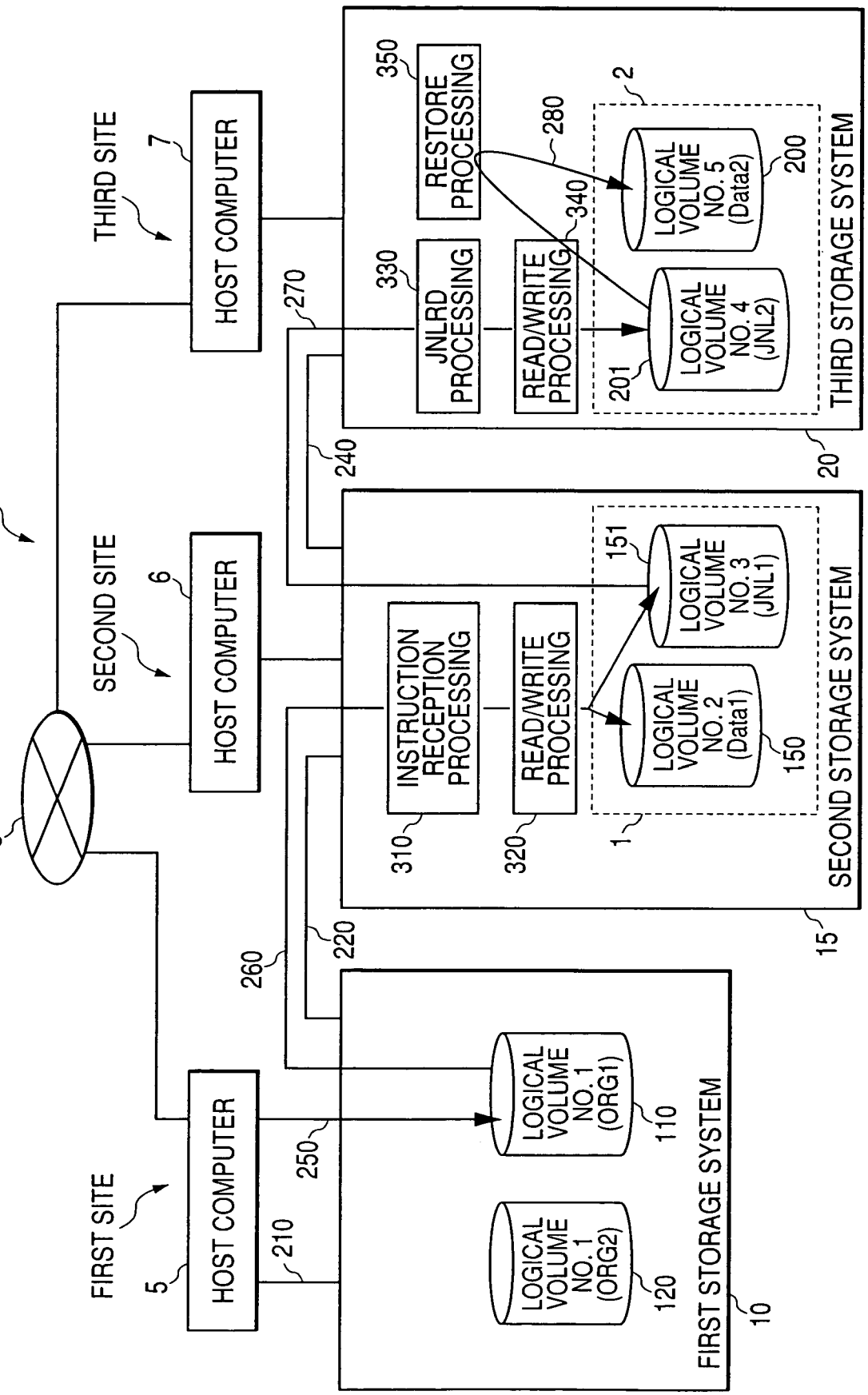
FIG. 1 is a block diagram showing a first embodiment of the present invention.

FIG. 1 is a block diagram showing a first embodiment of the present invention. FIG. 1 shows an entire remote copy system including plural storage systems. A storage system 10 is connected to a host computer 5 via a connection line 210. (According to circumstances, this storage system 10 will be hereinafter referred to as a first storage system, and a data processing system including this first storage system and the host computer 5 will be hereinafter referred to as a first site.)

A storage system 15 is connected to the first storage system 10 via a connection line 220. (According to circumstances, this storage system 15 will be hereinafter referred to as a second storage system, and a data processing system including at least this second storage system will be hereinafter referred to as a second site or an intermediate site.)

A storage system 20 is connected to the storage system 15 serving as the second storage system via a connection line 240. (According to circumstances, this storage system 20 will be hereinafter referred to as a third storage system, and a data processing system including at least this third storage system 20 will be hereinafter referred to as a third site.)

The connection lines 210, 220, and 240 may be directly connected lines such as fiber cables or may be connection via a wide-area network such as the Internet.

The storage system 10 in the first site retains a logical volume 110 (ORG1) and a logical volume 120 (ORG2). In this embodiment, it is assumed that an original data to be a copy object is stored in the logical volume 110 (ORG1).

The storage system 15 in the second site retains a copy of the logical volume 110 (ORG1) as a logical volume 150 (Data 1). The storage system 20 in the third site retains a logical volume 200 (Data 2) in which copied data is stored.

Here, a capacity and a physical storage position (physical address) of a logical volume, which are defined in the storage systems 10, 15, and 20, can be designated using maintenance terminals (not shown) such as computers connected to the respective storage systems or host computers 5, 6, and 7, respectively.

In the following description, in order to facilitate distinction between copy object data and copied data, a logical volume, in which the copy object data is accumulated, will be referred to as a primary logical volume, and a logical volume, in which the copied data is accumulated, will be referred to as a secondary logical volume. The primary logical volume and the secondary logical volume forming a pair will be referred to as a pair. A relation between the primary logical volume and the secondary logical volume, states of the primary logical volume and the secondary logical volume, and the like are saved as a pair setting information table 500 in shared memories (SMs) 70 in the respective storage systems to be described later.

First, an example of a hardware configuration of the storage system 10 shown in FIG. 1 will be described with reference to FIG. 2. The second storage system, which is shown as the storage system 15 in FIG. 1, is simply illustrated as the second storage system 15 in FIG. 2.

The first storage system 10 has plural channel adapters 50 for connecting the first storage system 10 to the host computer 5. These channel adapters 50 are connected to the host computer 5 and the second storage system 15 via the connection line 210.

The channel adapters 50 are connected to caches 60 via a connection unit 55, analyzes a command received from a host apparatus, and controls reading-out and writing of data, which is desired by the host computer 5, on the caches 60. The logical volume 110 (ORG1) and the logical volume 120 (ORG2) are arranged over plural HDDs 100.

Figures 3, 4:
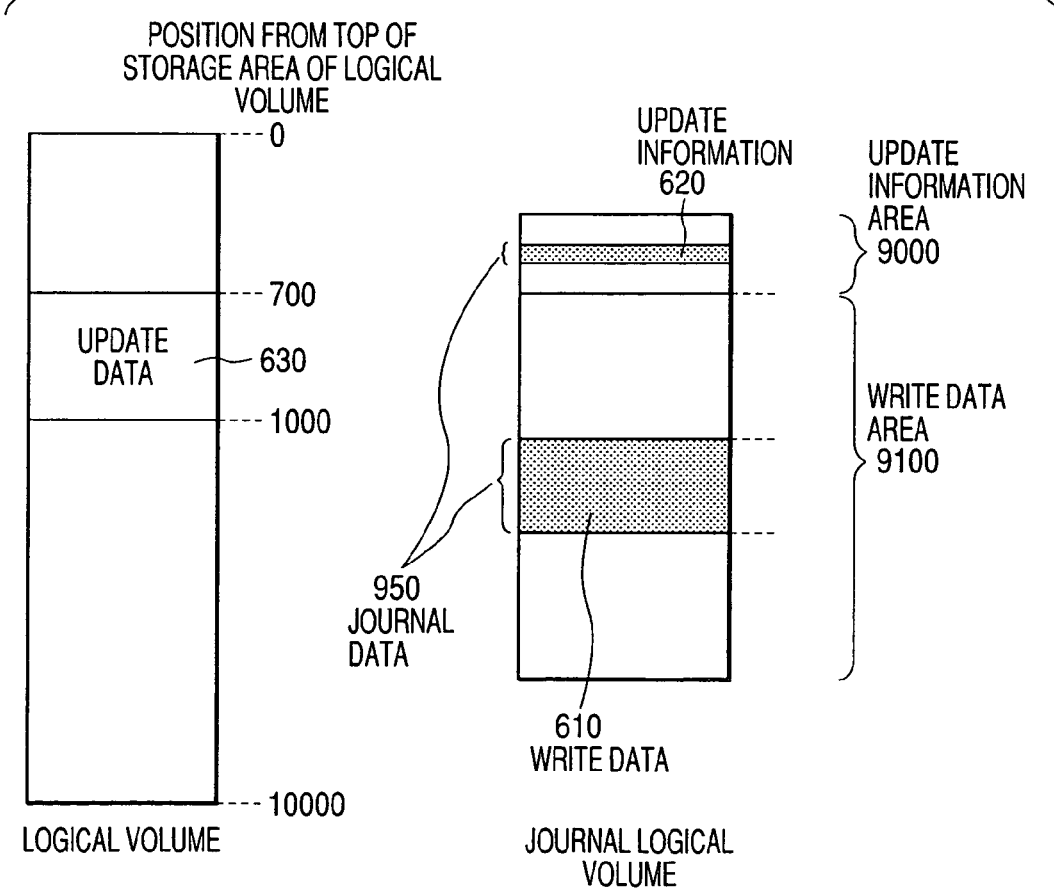
FIG. 3 is a diagram showing a volume information table.
FIG. 4 is a diagram for explaining a journal.

FIG. 3 shows an example of a table in which logical volumes and physical addresses on the HDDs 100 are defined, and capacities, attribute information such as formats, and pair information of the logical volumes are defined. Here, for convenience of explanation, logical volume numbers are treated as unique to respective logical volumes in a data center.

Note that it is also possible to set the logical volume numbers so as to be uniquely defined by a unit of each storage system and specified in conjunction with identifiers of the storage systems. "Not used" in a volume state indicates that a logical volume is set but is not used yet. "Primary" indicates that a logical volume is in a state in which the logical volume can operate normally as the primary volume of the pair volume described above. "Normal" indicates that a logical volume is not set as a pair with another logical volume but is in a normal state. "Secondary" indicates that a logical volume is a secondary volume and can operate normally. Volume state information indicating a state of a pair will be described later.

This example shown in FIG. 3 represents states of logical volumes in a data center system of this application. A logical volume number 1 indicates the logical volume 110 (ORG1) of the first storage system 10, and a logical volume number 2 indicates a state in which the logical volume 150 (Data 1) of the second storage system 15 and the pair number 1 form a pair. Similarly, a logical volume 151 (JNL1) of the second storage system 15 is represented as a logical volume number 3. A logical volume 201 of the third storage system 20 is represented as a logical volume number 4, and a logical volume 200 of the third storage system 20 is represented as a logical volume number 5. Note that, although not used, the logical volume 120 (ORG2) is defined as a logical volume number 6.

A column of a physical address in FIG. 3 indicates addresses on the actual HDDs 100. On the basis of this information, microprocessors (not shown) on disk adapters 80 in FIG. 2 controls an operation for recording data on the actual HDDs 100 from the caches 60 and an operation for reading out data from the HDDs 100 to the caches 60.

The storage system 10 is described above as a representative storage system. However, the other storage systems 15 and 20 shown in FIG. 1 also have substantially the same structure. The connection unit 55 may be constituted by a switch or the like for directly connecting channel adapters and caches or the like or may adopt a connection system using a bus. Note that FIG. 2 shows a state in which there are the shared memories 70 in the caches 60. However, the shared memories 70 maybe connected to the connection unit 55 separately from the caches 60.

Next, an operation for reflecting data update, which is applied to the primary logical volume 110 (ORG1) in the storage system 10 in the first site, on the logical volume 200 (Data2) of the storage system 20 in the third site via the storage system 15 in the second site (intermediate site) will be explained with reference to FIG. 1.

Here, first, journal data will be explained. In order to facilitate explanation, a logical volume of an update source, in which data is updated, is distinguished from the other logical volumes to be referred to as a source logical volume, and a volume, which retains a copy of the update source logical volume, is referred to as a copy logical volume.

The journal data consists of, when data update is applied to a certain source logical volume, at least updated data itself and update information indicating to which position of the source logical volume the update is applied (e.g., a logical address on the source logical volume).

In other words, as long as the journal data is retained when data in the source logical volume is updated, the source logical volume can be reproduced from the journal data.

On the premise that there is a copy logical volume having the same data image as the source logical volume at a certain point in time, as long as the journal data is retained every time data in the source logical volume after that point is updated, it is possible to reproduce the data image of the source logical volume at or after the certain point in time in the copy logical volume.

If the journal data is used, the data image of the source logical volume can be reproduced in the copy logical volume without requiring the same capacity as the source logical volume. A volume in which the journal data is retained will be hereinafter referred to as a journal logical volume.

Data update will be further explained with reference to FIG. 4. FIG. 4 shows a state in which data from addresses 700 to 1000 of a certain source logical volume is updated (updated data 630). In this case, in a journal logical volume forming a pair with the source logical volume, data itself updated as the journal data 950 is recorded in a write data area 9100 as write data 610, and information relating to update, for example, information indicating which position is updated is recorded as update information 620 in an update information area 9000.

The journal logical volume is used in a state in which it is divided into a storage area 9000 (update information area), in which the update information 620 is stored, and a storage area 9100 (write data area), in which write data is stored. Update information is stored in the update information area 9000 in an order of update (an order of an update number) from the top of the update information area 9100. When the update information reaches the end of the update information area 9100, the update information is stored from the top of the update information area 9100. Write data is stored in the write data area 9100 from the top of the write data area 9100. When the write data reaches the write data area 9100, the write data is stored from the top of the write data area 9100. It is needless to mention that it is necessary to apply update work to a logical volume of a copy destination on the basis of information in the journal logical volume before the data exceeds a capacity reserved for the journal logical volume. A ratio of the update information area 9000 and the write data area 9100 may be a fixed value or may be set by the maintenance terminal or the host computer 5.

In FIG. 1, when the storage system 10 receives a write instruction for the data in the primary logical volume 110 (ORG1) in the storage system 10 from the host computer 5 (arrow 250 shown in FIG. 1), the data in the primary logical volume 110 (ORG1) in the first storage system 10 is updated. Then, the logical volume 150 (Data1) in the storage system 15 in the second site (intermediate site), which forms a pair with the updated primary logical volume 110 (ORG1), is updated in the same manner (update of a synchronized pair). Consequently, the second storage system 15 can take over the job immediately even if a failure has occurred in the first storage system 10. This is because the second storage system 15 retains the secondary logical volume 150 (Data1) having the same data image as the primary logical volume 1.10 (ORG1) used by the host computer 5.

On the other hand, when data update is applied to the logical volume 150 (Data1), the storage system 15 in the second site saves journal data in the logical volume 151 (JNL1) (hereinafter referred to as a journal volume according to circumstances) (arrow 260 shown in FIG. 1).

The journal data, which is accumulated in the logical volume 151 (JNL1) for accumulation of journal data in the second storage system 15, is asynchronously transferred to the logical volume 201 (JNL2) for journal accumulation in the third storage system 20 located a long distance apart from the second storage system 15 via the connection line 240 (arrow 270 shown in FIG. 1) (hereinafter referred to as a PUSH system). The third storage system 20 reproduces the logical volume 200 (Data2) corresponding to the logical volume 150 in the second storage system 15 using the journal data in the journal volume 201 (JNL2) in the storage system 20 (arrow 280 shown in FIG. 1, restore processing).

The data in the journal volume in the second storage system 15 maybe read out from the third storage system 20 and accumulated in the logical volume 201 (JNL2) in the storage system 20 (hereinafter referred to as PULL system).

This PULL system will be explained specifically. Upon receiving an instruction to read journal data (hereinafter referred to as journal read instruction) from the third storage system 20, the second storage system 15 reads out journal data from the journal logical volume 151 (JNL1) and sends the journal data to the third storage system 20.

Thereafter, the third storage system 20 reads out the journal data from the journal logical volume (JNL2) 201 according to restore processing 350 to be described later and updates the data in the logical volume 200 (Data2). This completes the processing for reflecting the data update, which is carried out for the primary logical volume 110 (ORG1) in the storage system 10 in the first site, on the secondary logical volume 200 (Data2) in the storage system 20 in the third site.

By saving the journal data in the journal volume 201, for example, it is also possible not to perform data update for the secondary logical volume 200 (Data2) when the journal data is received, that is, not to create a copy of the primary logical volume 110 (ORG1) in the secondary logical volume 200 (Data2) using the journal data (restore processing 350) when a load of the storage system 20 is high, and update the data in the secondary logical volume 200 (Data2) after a short time when a load of the storage system 20 is low.

As described above, the logical volume 151 (JNL1) in the second storage system 15 shown in FIG. 1 is a storage area dedicated for journal data and can be made smaller than a storage area that is a data copy object. This makes it possible to copy data to the second and the third storage systems 15 and 20 from the first storage system 10 by controlling consumption of a storage area in the second storage system 15.

Next, setting for an entire data center system will be explained specifically. This setting is adopted in performing an operation for reflecting the data update for the logical volume 110 (ORG1) in the storage system 10 on the second storage system 15 in the intermediate site and the third storage system 20 in the third site.

In order to establish a data center system consisting of plural sites as shown in FIG. 1, first, for example, setting for the logical volume 150 (Data1) and the journal volume 151 (JNL1) to form a journal group is required. The journal group means a pair of logical volumes. As explained above, the journal group consists of a logical volume and a journal volume in which, when an instruction to write data in the logical volume is received, the write instruction is sectioned into update information such as a write destination address and write data and accumulated.

In the example of FIG. 1, the logical volume 150 (Data1) and the logical volume 151 (JNL1) form a journal group in the storage system 15, and the logical volume 201 (JNL2) and the logical volume 200 (Data2) form a journal group in the storage system 20.

Figure 5:
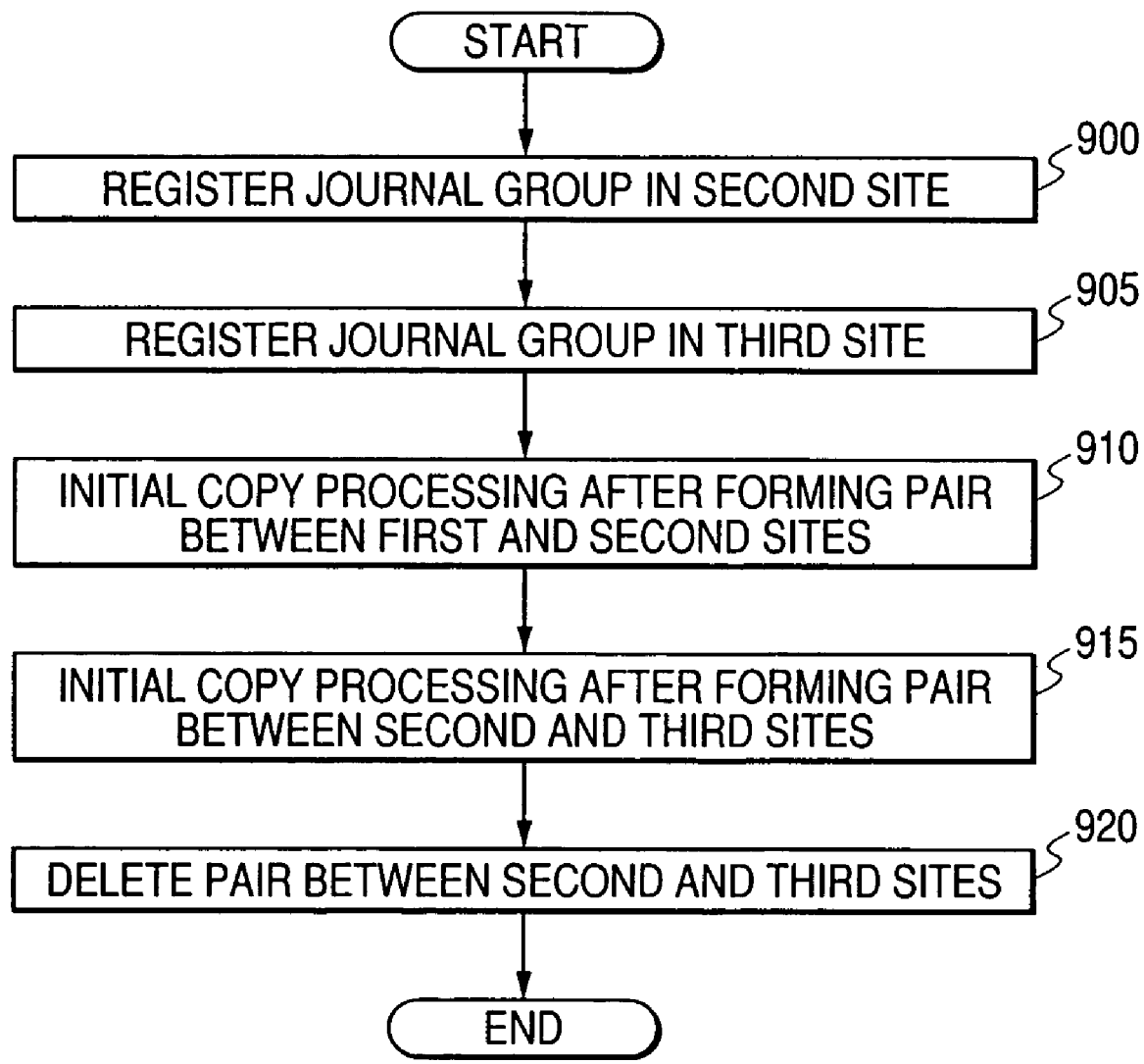
FIG. 5 is a flowchart showing initial copy processing.

A flowchart in FIG. 5 shows an initial setting procedure of the data center system of the present invention. A user sets journal groups for the respective storage systems using GUIs (graphical user interfaces) included in the host computers 5, 6 and 7 or the maintenance terminals not shown in FIG. 1 (steps 900 and 905).

In FIG. 1, the journal groups in the storage system 15 and the storage system 20 in the second and the third sites, that is, the pair of Data1 and JNL1 and the pair of Data2 and JNL2 are referred to as a journal group 1 and a journal group 2, respectively. The journal groups may be referred to as journal pairs. More specifically, the journal groups are retained in the shared memories 70 as a journal group setting information table 550.

Moreover, the user designates information indicating a data copy object and information indicating a data copy destination and sends a pair registration instruction to the first and the second storage systems 10 and 15 using the maintenance terminals or the host computers 5 and 6 connected to the respective storage systems (step 910). More specifically, the user sets a pair relation between the logical volume 110 (ORG1) and the logical volume 150 (Data1) in FIG. 1.

When the logical volume 110 (ORG1) and the logical volume 150 (Data1) are set as a pair, according to a status of the pair, write processing applied to a primary logical volume serves as an opportunity for performing various kinds of processing with respect to a secondary logical volume. For example, the status of the pair includes a suspend state, a pair state, an initial copy state, and the like. When the status of the pair is the pair state, processing for writing data, which is written in the primary logical volume, in the secondary logical volume as well is performed. When the status of the pair is the suspend state, data, which is written in the primary logical volume, is not reflected on the secondary logical volume, and a difference between the primary logical volume and the secondary logical volume is retained in the first storage system 10 using a bit map.

Figure 2:
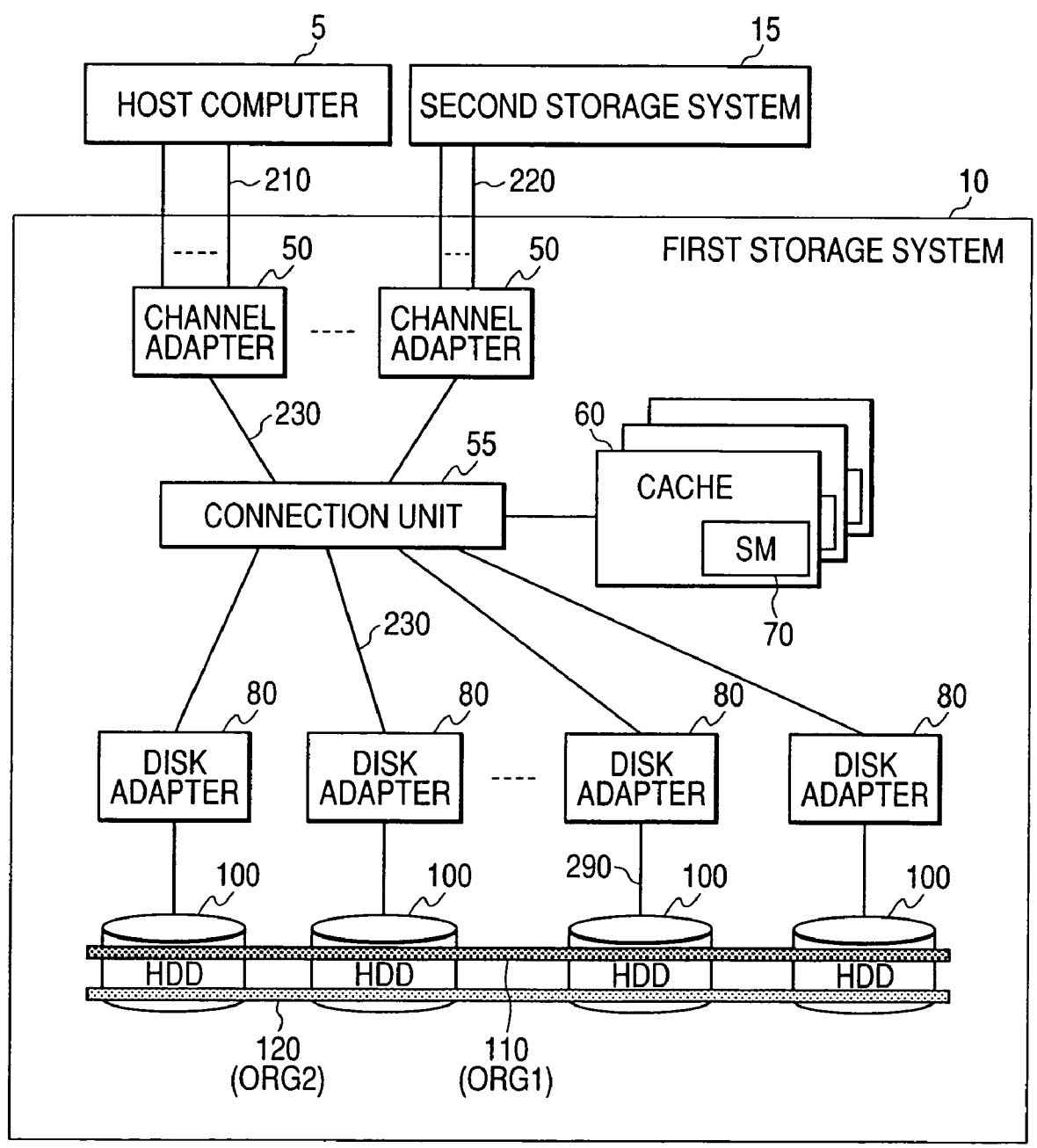
FIG. 2 is a block diagram showing an internal structure of a storage system.

As described above, setting information for the journal group and setting information for this pair are accumulated in the shared memories (SMs) 70 shown in FIG. 2. The microprocessors on the channel adapters 50 execute processing on the basis of the information. It is needless to mention that, in this processing, the shared memories (SMs) 70 do not necessarily have to be referred to every time the processing is performed, and information necessary for processing for a channel processor may be transferred onto a local memory of the channel processor in advance.

FIG. 6 shows an example of a pair setting information table 500 showing states of pairs. A first row of FIG. 6 indicates that a pair of the logical volume 116 (ORG1) (logical volume number 1) in the first storage system 10 and the logical volume 150 (Data1) (logical volume number 2) in the second storage system 15 is generated as a pair number 1. In step 910 in FIG. 5, initial copy, which is initialization processing for making data images of the logical volume 110 (ORG1) and the logical volume 150 (Data1) identical, is further performed.

In the next step 915, the user designates the logical volume 150 (Data1) and the logical volume 200 (Data2) to form a pair and performs initial copy. This is for giving the identical data image to the logical volume 150 (Data1) and the logical volume 200 (Data2) as in the processing in step 910.

A row of a pair number 2 in FIG. 6 shows a state in which this pair is set. This pair is deleted after the initial copy processing ends (step 920).

When the data image of the logical volume 110 (ORG1) in the first storage system is copied to the logical volumes 150 (Data1) and 200 (Data2) in the storage systems 15 and 20, copy programs in the storage systems 15 and 20 inform the maintenance terminal or the host computer 5 of the end of the copy. After this initialization processing,.accurate restore processing (recovery) for data in the storage system 20 becomes possible.

Next, an operation of the storage system in an embodiment of the storage system of the present invention will be explained in detail with reference to FIGS. 8 and 9.

Figure 8:
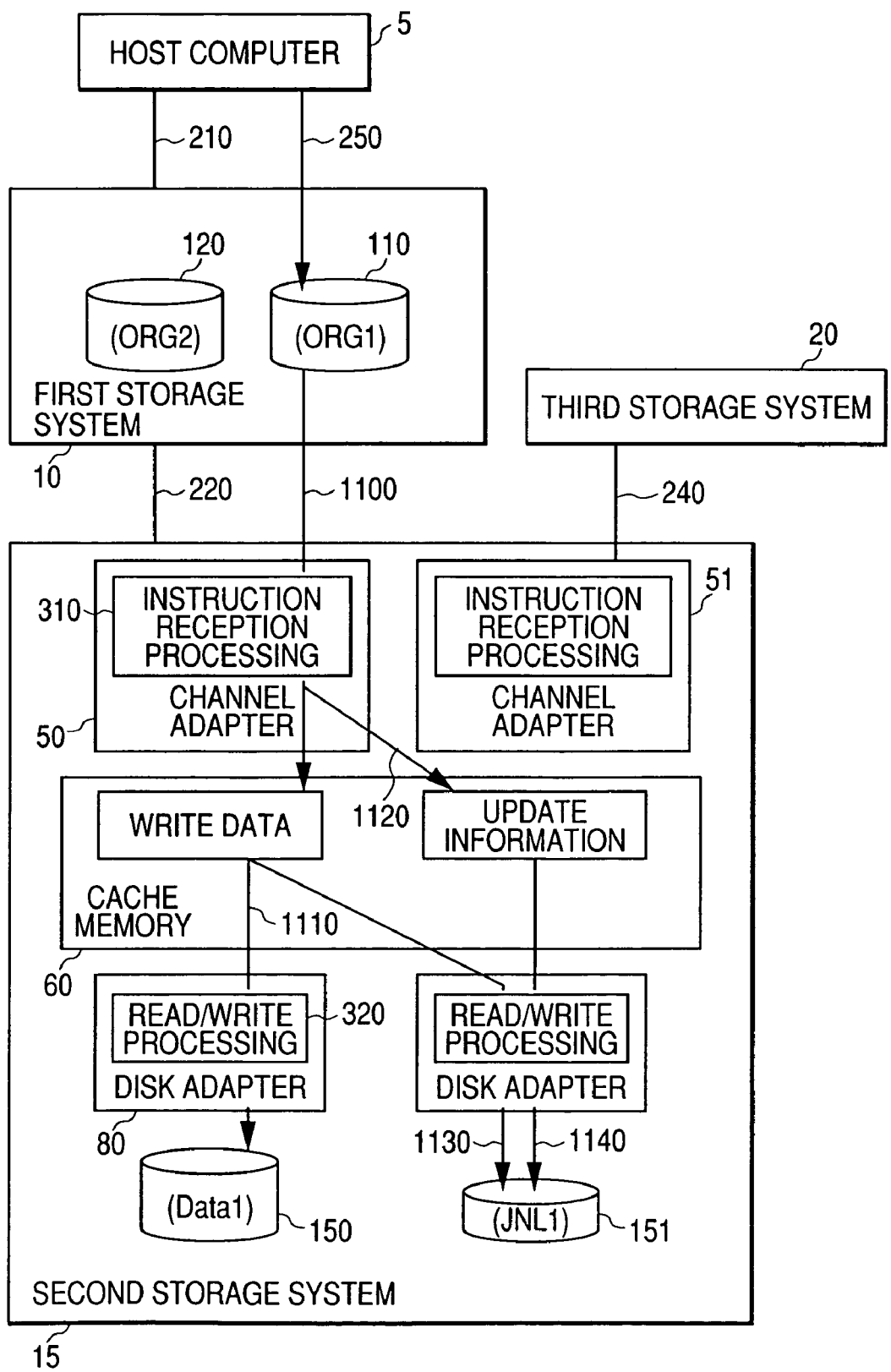
FIG. 8 is a block diagram showing a flow of access instruction reception processing.

FIG. 8 is a block diagram showing data write processing that is performed by the storage system 15 in the second site. The second storage system 15 is connected to the storage system 10 in the first site by the connection line 200 via the channel adapter 50. The first storage system 10 is connected to the host computer 5 via the connection line 210.

First, the first storage system 10 receives a data write instruction from the host computer 5 via the connection line 210 (arrow 250 in FIG. 8). When the data is written in the logical volume 110 (ORG1), the second storage system 15 receives the data write instruction from the first storage system 10 via the connection line 220.

An arrow 1100 shown in FIG. 8 indicates a flow of data in the case in which the data write instruction for writing data in the logical volume 150 (Data1) of a data copy destination in the storage system 15 in the second site is received.

Upon receiving the data write instruction for writing data in the logical volume 150 (Data1) from the first storage system, the channel adapter 50 retains the write data and update information in the cache memory 60. The write data on the cache 60 is written in the logical volume 150 (Data1) by the disk adapter 80 at timing different from timing for writing data in the cache 60 (arrow 1110 in FIG. 8).

Similarly, the update information (including at least an updated address) recorded on the cache 60 is written in an update information area of the logical volume 151 (JNL1), and the write data is further accumulated in a write data area of the logical volume 151 (JNL1) (arrow 1120 in FIG. 8). The disk adapter 80 writes the write data and the update information on the cache 60 in an address allocated to the logical volume 151 (JNL1) on the HDD (arrows 1130 and 1140 in FIG. 8).

On the other hand, a channel adapter 51, which is connected to the third storage system 20 via the connection line 240, receives a read instruction for the logical volume 151 (JNL1) from the storage system 20. This point will be described later with reference to FIG. 11. Note that the channel adapters 50 and 51 are channel adapters of the same structure but are given different numbers according to circumstances for convenience of explanation.

Figure 9:
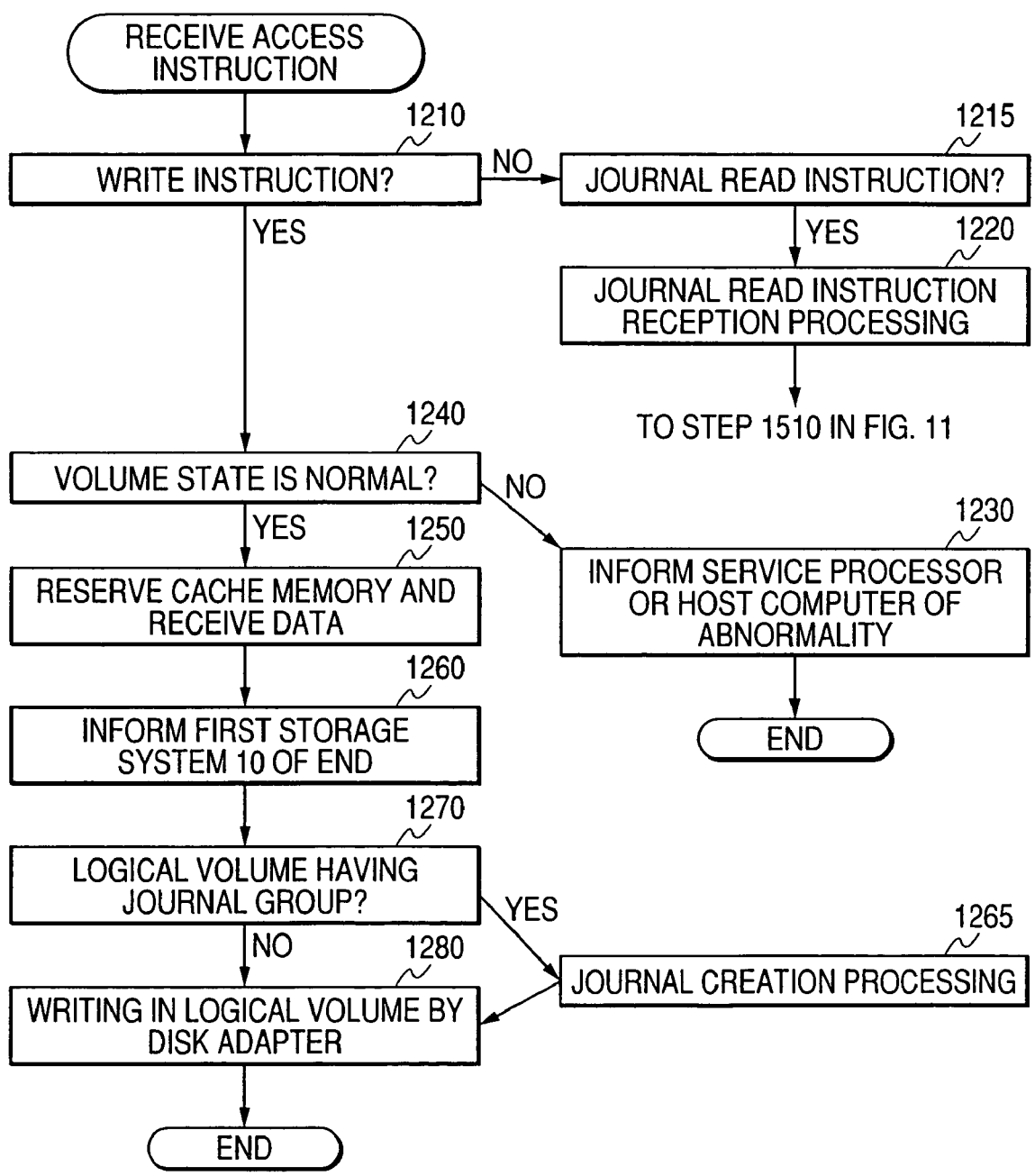
FIG. 9 is a flowchart explaining the access instruction reception processing.

FIG. 9 is a flowchart showing processing in the case in which the logical volume 150 (Data1) in the storage system 15 in the second site receives an instruction from the storage system 10 in the first site.

Upon receiving an access instruction from the first storage system 10, the microprocessor mounted on the channel adapter 50 in FIG. 8 (hereinafter simply referred to as channel adapter 50) checks a type of the instruction (step 1210 in FIG. 9). This is because a channel adapter may receive a write instruction as in the channel adapter 50 in FIG. 8 or may receive a read instruction from another storage as in the channel adapter 51.

If the received access instruction is not a write instruction but a journal read instruction from the third storage system 20, the channel adapter 50 performs journal read reception processing to be described later (steps 1215 and 1220).

If the access instruction is a write instruction in step 1210, the channel adapter 50 checks a volume state of the logical volume 150 (Data1) (step 1240).

As shown in FIG. 3, states of the respective logical volumes are accumulated in the shared memories (SMs) 70 as volume information in a table format as described above.

If the volume state of the logical volume 150 (Data1) is not normal in step 1240, since access to the logical volume 150 (Data1) is impossible, the channel adapter 50 informs the host computer 5 of abnormality and ends the processing (step 1230).

If the volume state of the logical volume 150 (Data1) is normal in step 1240, the channel adapter 50 reserves the cache memory 60 and receives data (step 1250). More specifically, the channel adapter 50 informs the first storage system 10 that the channel adapter 50 is prepared for receiving data. Thereafter, the first storage system 10 sends write data to the second storage system 15. The channel adapter 50 in the second storage system 15 receives the write data and saves the write data in the prepared cache memory 60 (step 1250, arrow 1100 in FIG. 8). Thereafter, in step 1260, the channel adapter 50 informs the first storage system 10 of the end of the processing.

Next, the channel adapter 50 checks whether the logical volume 150 (Data1) is a logical volume having a journal group with reference to the journal group setting information table 550 (see FIG. 7) recorded in the shared memories (SMs) 70 (step 1270).

Here, FIG. 7 will be explained in detail. FIG. 7 is a diagram showing how journal pairs are formed among logical volumes. A first row indicates that logical volumes with logical volume numbers 2 and 3 form a journal group. More specifically, the first row indicates that the logical volume 150 (Data1) and the logical volume 151 (JNL1) in the storage system 15 form a journal pair.

If the logical volume 150 (Data1) is a logical volume having a journal group, the channel adapter 50 applies journal creation processing to this volume and the journal logical volume 151 (JNL1) forming the journal group (step 1265). Thereafter, at arbitrary timing, the disk adapter 80 writes data in the logical volume 150 (Data1) and the logical volume 151 (JNL1) that are defined on the HDD (step 1280, arrows 1130 and 1140 in FIG. 8).

As described above, the journal is created in the second storage system 15, the journal data is sequentially stored in the journal volume 151 (JNL1). The journal data is sent to the journal volume 201 (JNL2) in the third storage system 20 with a fixed factor as an opportunity. One method for sending the journal data is the PUSH system described above, and there is the PULL system as another method. The PULL system will be explained with reference to FIG. 10.

Figure 10:
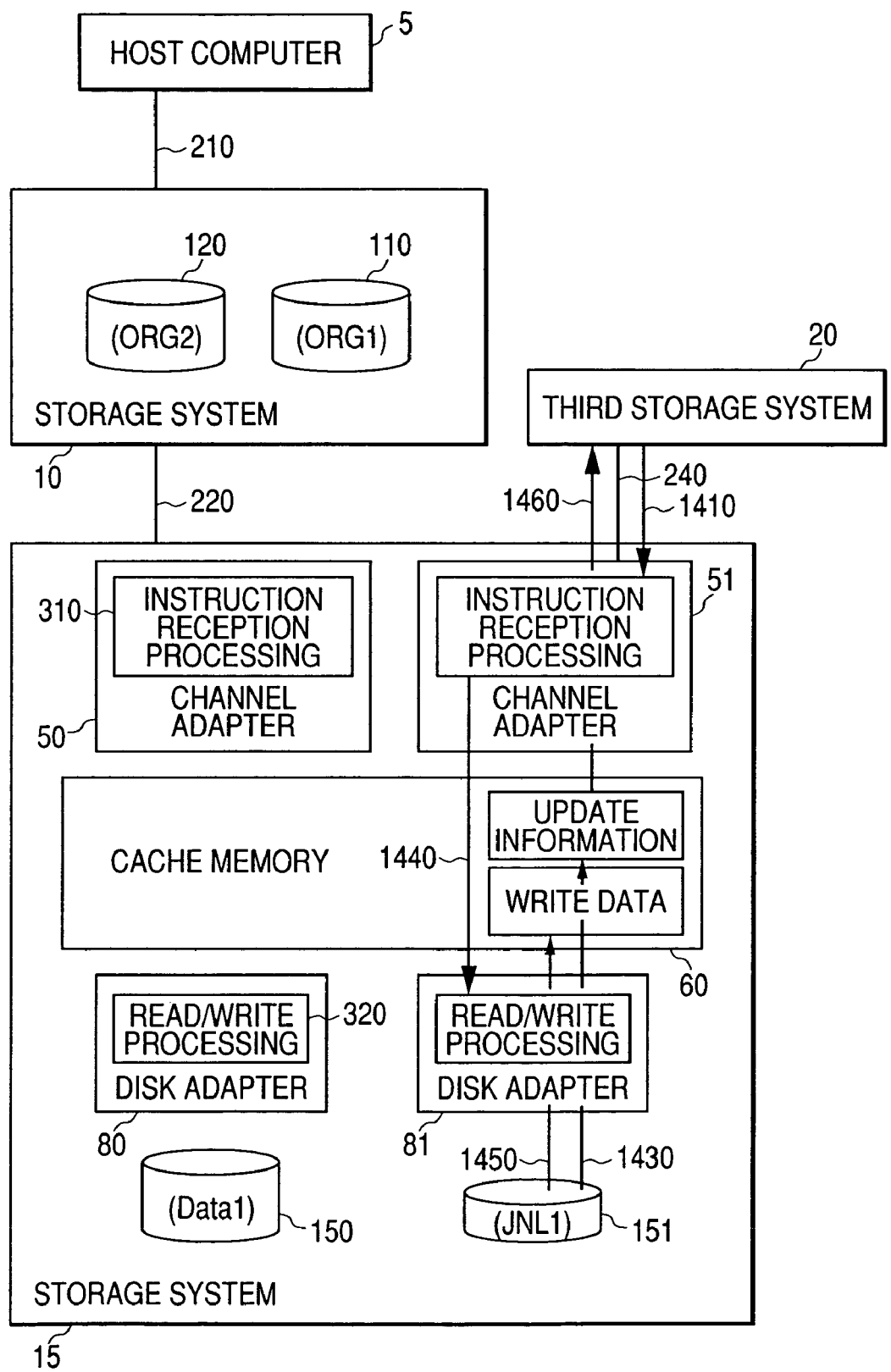
FIG. 10 is a block diagram showing an operation (journal read reception processing) of a channel adapter 50 of a storage system 15 that has received a journal read instruction.
Figure 11:
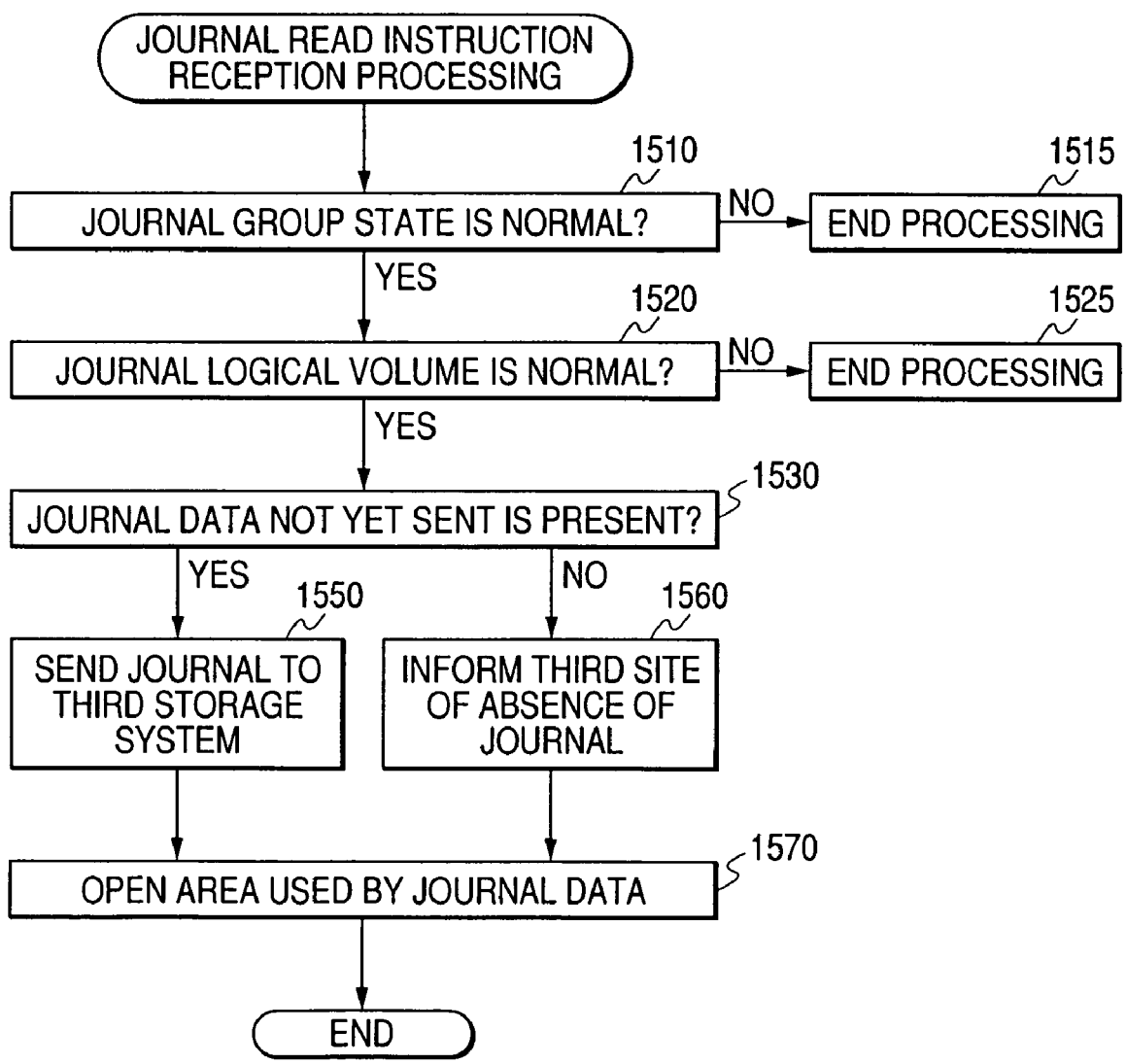
FIG. 11 is a flowchart explaining journal read instruction reception processing.

FIG. 10 is a block diagram showing an operation (journal read instruction reception processing) of the channel adapter 51 in the second storage system 15 that has received a journal read instruction. FIG. 11 is a flowchart of the operation. An operation in the case in which the second storage system 15 has received the journal read instruction from the third storage system 20 will be explained with reference to FIGS. 10 and 11.

The channel adapter 51 in the second storage system 15 receives an access instruction from the third storage system 20 (arrow 1410 in FIG. 10). When the access instruction is a journal read instruction, the channel adapter 51 checks whether a journal group state is "normal" with reference to FIG. 7 (step 1510). If the journal group state is a state other than "normal", for example, "failure", the channel adapter 51 informs the third storage system 20 of the journal group state and ends the processing. The third storage system 20 performs processing according to the informed journal group state. For example, if the journal group state is "failure", the channel adapter 51 ends the journal read processing (step 1515).

If the journal group state is "normal" in step 1510, the channel adapter 51 checks a state of a journal logical volume (step 1520).

If the volume state of the journal logical volume is not "normal", for example, if the volume state of the journal logical volume is "failure" in step 1520, the channel adapter 51 changes the journal group state shown in FIG. 7 to "failure", informs the storage system 20 of the journal group state, and ends the processing (step 1525).

Instep 1530, the channel adapter 51 checks whether journal data, which has not been sent, is present. If journal data, which has not been sent, is present, the channel adapter 51 sends the journal data to the third storage system 20 (step 1550). If all journal data have been sent to the storage system 20, the channel adapter 51 informs the third storage system 20 of "absence of journal data" (step 1560). Thereafter, the channel adapter 51 opens an area in which the journal data was present (step 1570).

Processing in the case in which journal data, which has not been sent, is present will be explained more in detail with reference to FIG. 10. If journal data, which has not been sent, is present, the channel adapter 51 reserves the cache memory 60 and instructs the disk adapter 81 to read the update information and the write data in the cache memory 60 (arrow 1440 in FIG. 10).

In read write processing of the disk adapter 81, the disk adapter 81 reads the update information and the write data from the logical volume 151 (JNL1) that is a logical area formed in a distributed manner on the HDD 100, saves the update information and the write data in the cache memory 60, and informs the channel adapter 51 of the same (arrows 1430 and 1450 in FIG. 10).

The channel adapter 51 is informed that the reading of the write data and the update information in the cache memory 60 has ended, sends the update information and the write data from the cache memory 60 to the third storage system 20, and then opens the cache memory 60 that retains journal data (arrow 1460 in FIG. 10).

The channel adapter 51 opens the storage area for the journal data that was sent to the third storage system 20 at the time of the processing of the last journal read instruction (step 1570).

Note that, in the journal read reception processing described above, the second storage system 15 sends the journal data to the third storage system 20 one by one. However, the second storage system 15 may sends plural journal data to the storage system 20 simultaneously.

The number of journal data to be sent at one journal read instruction may be designated in a journal read instruction by the third storage system 20 or may be designated in the second storage system 15 or the third storage system 20 by a user, for example, when a journal group is registered.

Moreover, the number of journal data, which is sent at one journal read instruction, may be changed dynamically according to transfer ability, load, or the like of the connection line 240 for the second storage system 15 and the third storage system 20. In addition, a transfer amount of journal data may be designated taking into account a size of write data of journal data rather than the number of journal data.

In the journal read instruction reception processing described above, journal data is read in the cache memory 60 from the HDD 100. However, when journal data is present in the cache memory 60, the processing is unnecessary.

The processing for opening a storage area for journal data in the journal read instruction reception processing is performed at the time of processing for the next journal read instruction. However, the storage area may be opened immediately after sending journal data to the third storage system 20. In addition, it is also possible that the third storage system 20 sets an update number, which may be opened, in a journal read instruction, and the second storage system 15 opens a storage area for journal data in accordance with an instruction of the third storage system 20.

The third storage system 20 having received the journal data stores the received journal data in the journal volume 201 (JNL2). Thereafter, the storage system 20 performs journal restore.

The third storage system 20 executes a journal restore program to restore data in the logical volume 200 (Data2) from the journal volume 201 (JNL2). Note that an area, in which the restored journal data was stored, is purged (opened) and used for storage of new journal data.

Figure 12:
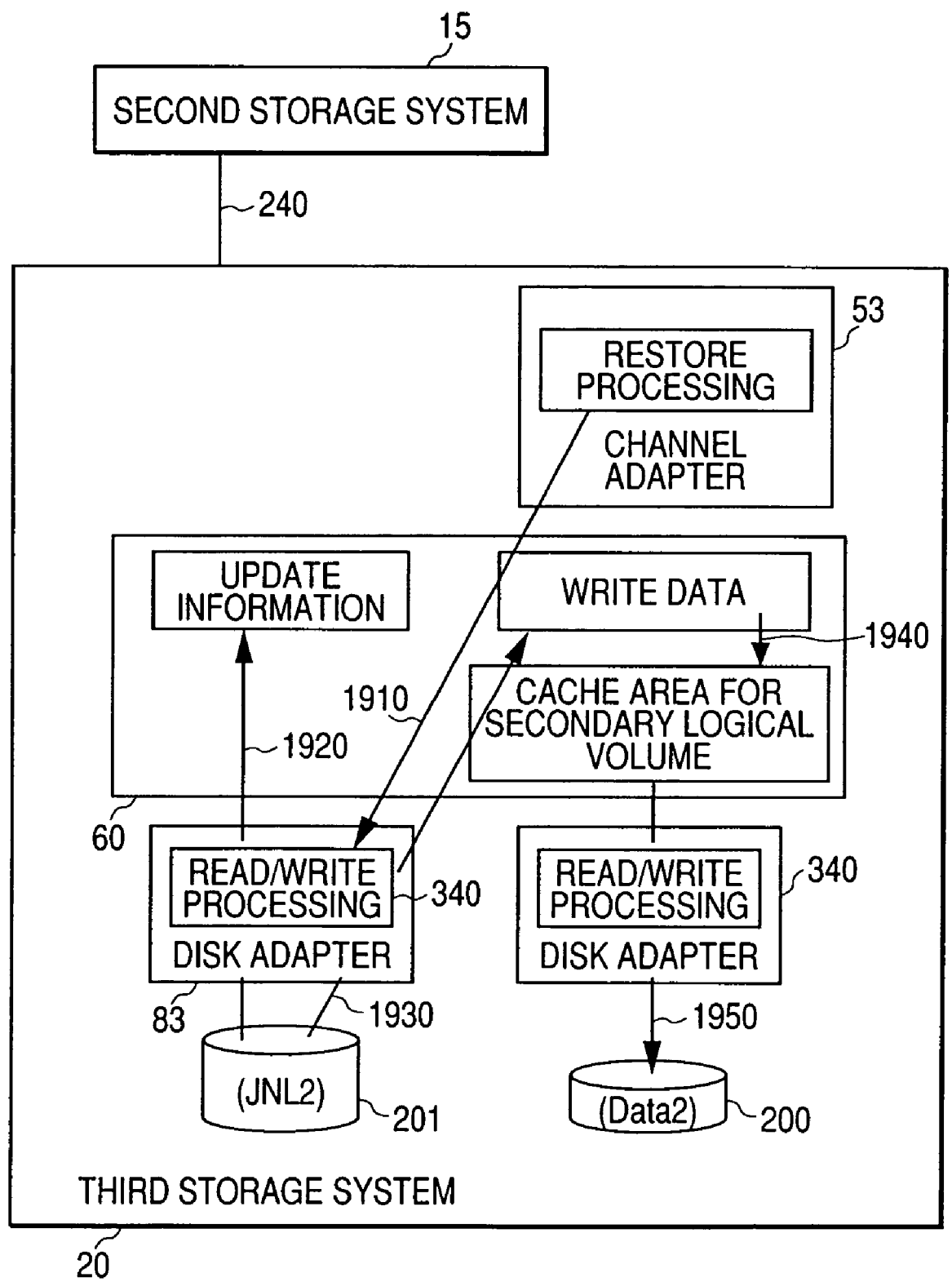
FIG. 12 is a block diagram showing restore processing.

Next, this journal restore processing will be explained in detail. FIG. 12 is a block diagram showing the restore processing, and FIG. 13 is a flowchart of the restore processing.

An operation in which a channel adapter 53 in the third storage system 20 updates data using journal data will be explained with reference to FIGS. 12 and 13. A disk adapter 83 in the storage system 20 may perform the restore processing.

Figure 13:
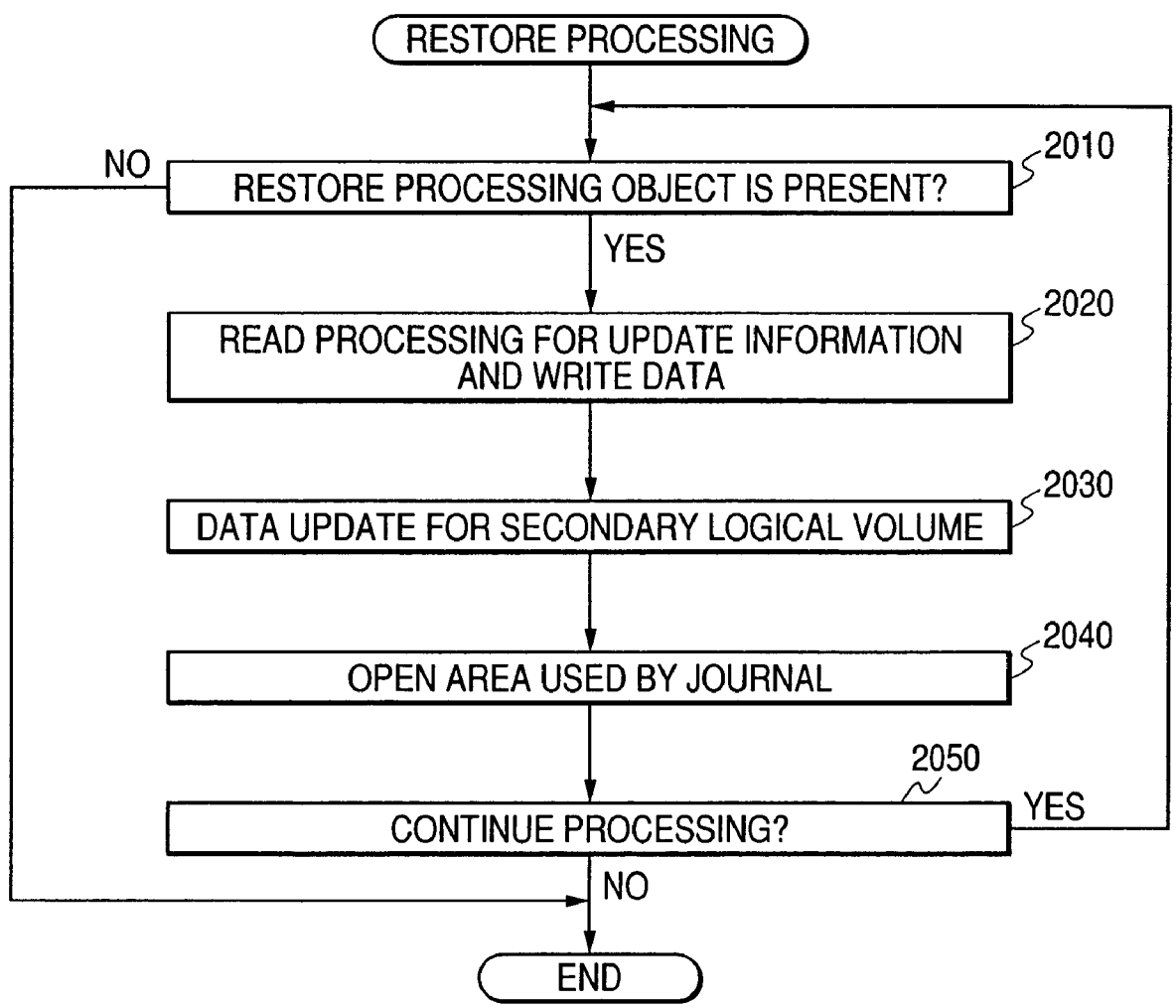
FIG. 13 is a flowchart showing the restore processing.

In step 2010 in FIG. 13, the channel adapter 53 checks whether restore object journal data is present in the logical volume 201 (JNL2). If the journal data is not present in the logical volume 201 (JNL2), the channel adapter 53 ends the restore processing once, and after a fixed time, resumes the restore processing (step 2010).

If the restore object journal data is present in step 2010, the channel adapter 53 applies the following processing to oldest (smallest) journal data. The channel adapter 53 only has to continuously give update numbers to the journal data and apply the restore processing to update information of journal data having an oldest (smallest) update number. The channel adapter 53 reserves the cache memory 60 (arrow 1910 in FIG. 12) and reads out update information and write data to the disk adapter 83 from the update information with the oldest number (step 2020, arrows 1920 and 1930 in FIG. 12).

More specifically, the disk adapter 83 in the third storage system 20 reads update information form the HDD 10, in which the update information is stored, according to read/write processing 340, saves the update information in the cache memory 60, and informs the channel adapter 53 of the update information.

Similarly, the disk adapter 83 in the third storage system 20 acquires write data on the basis of the read update information (step 1930) and issues an instruction to read the write data in an area of the cache memory 60 corresponding to a part of the logical volume 200 (Data2) that should be updated (step 2020, arrow 1940 in FIG. 12).

Then, the disk adapter 83 writes the write data from the secondary logical volume cache area into the secondary logical volume 200 (Data2) asynchronously to the restore processing (arrow 1950 in FIG. 12, step 2030). Thereafter, the disk adapter 83 opens (purges) an area where the update information and the write information of the secondary logical volume (JNL2) reflected on the secondary logical volume 200 (Data2) were present (step 2040). The disk adapter 83 judges whether to perform the restore processing continuously (step 2050). If the restore processing is performed continuously, the disk adapter 83 returns to step 2010, and if not, ends the restore processing.

In the restore processing described above, journal data is read in the cache memory 60 from the HDD 100. However, when the journal data is present in the cache memory 60, the processing is unnecessary.

Second Embodiment

Figure 14:
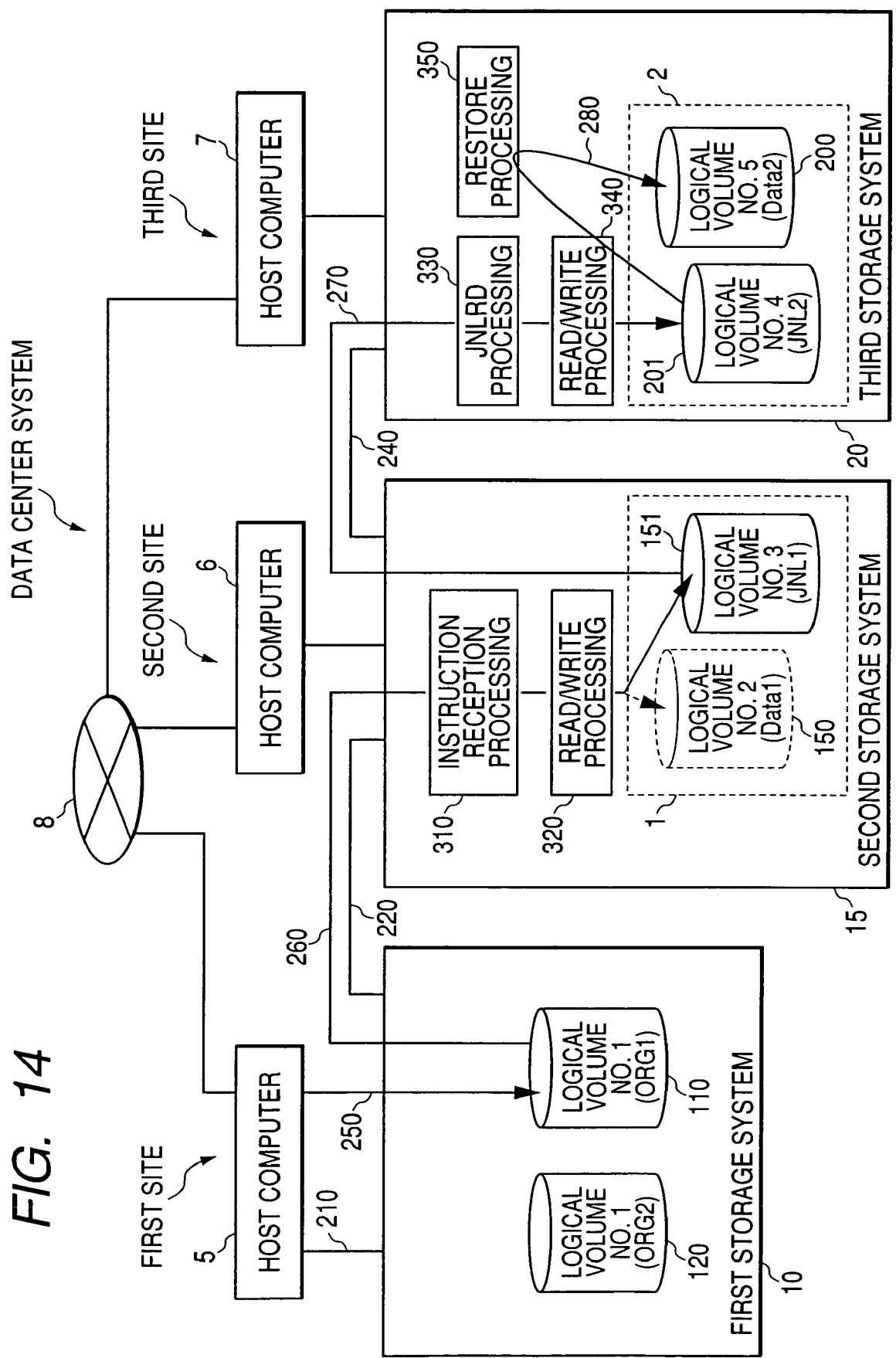
FIG. 14 is a block diagram showing a second embodiment of the present invention.
Figures 15, 16:
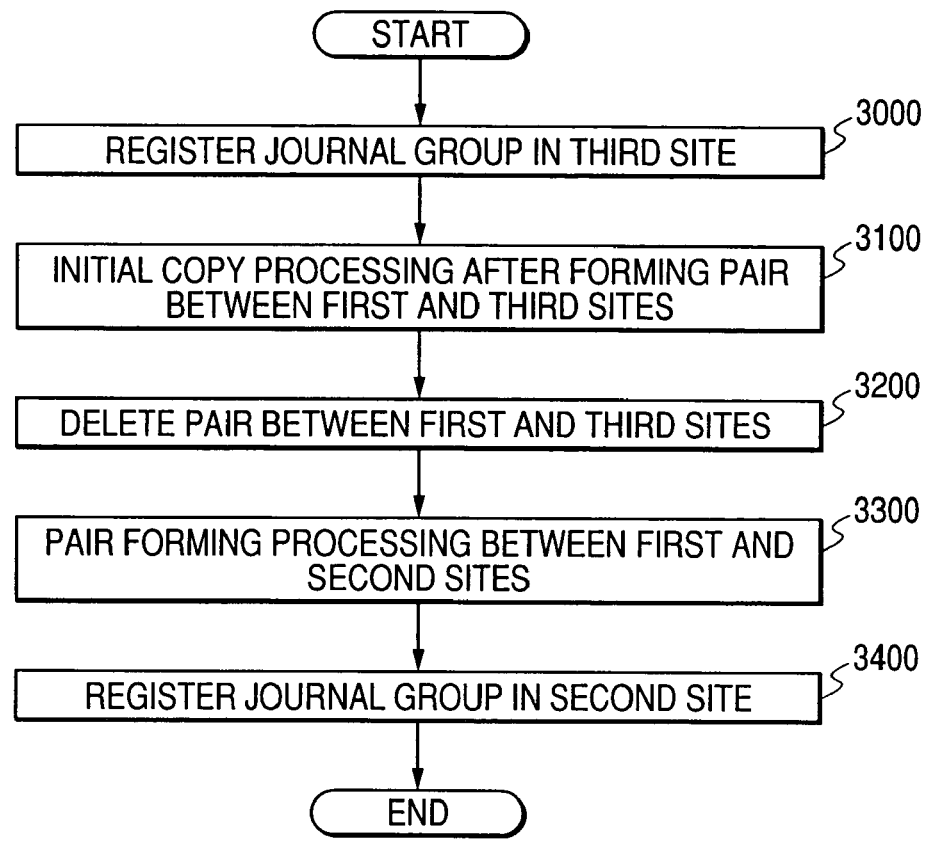
FIG. 15 is a flowchart showing initial setting processing in the second embodiment.
FIG. 16 is a diagram showing pair setting information.
Figure 17:
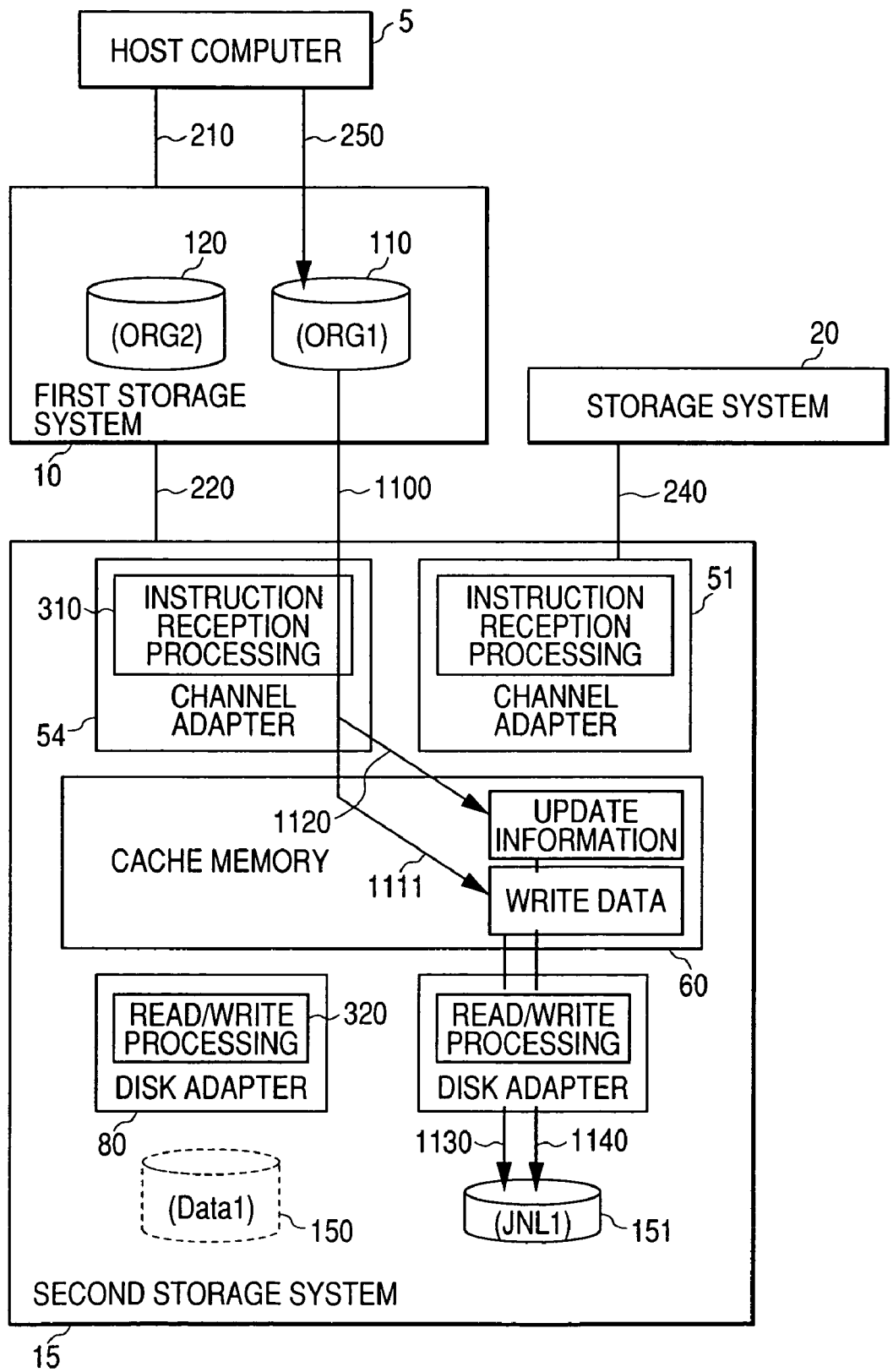
FIG. 17 is a block diagram showing a flow of access instruction reception processing in the second embodiment.
Figure 18:
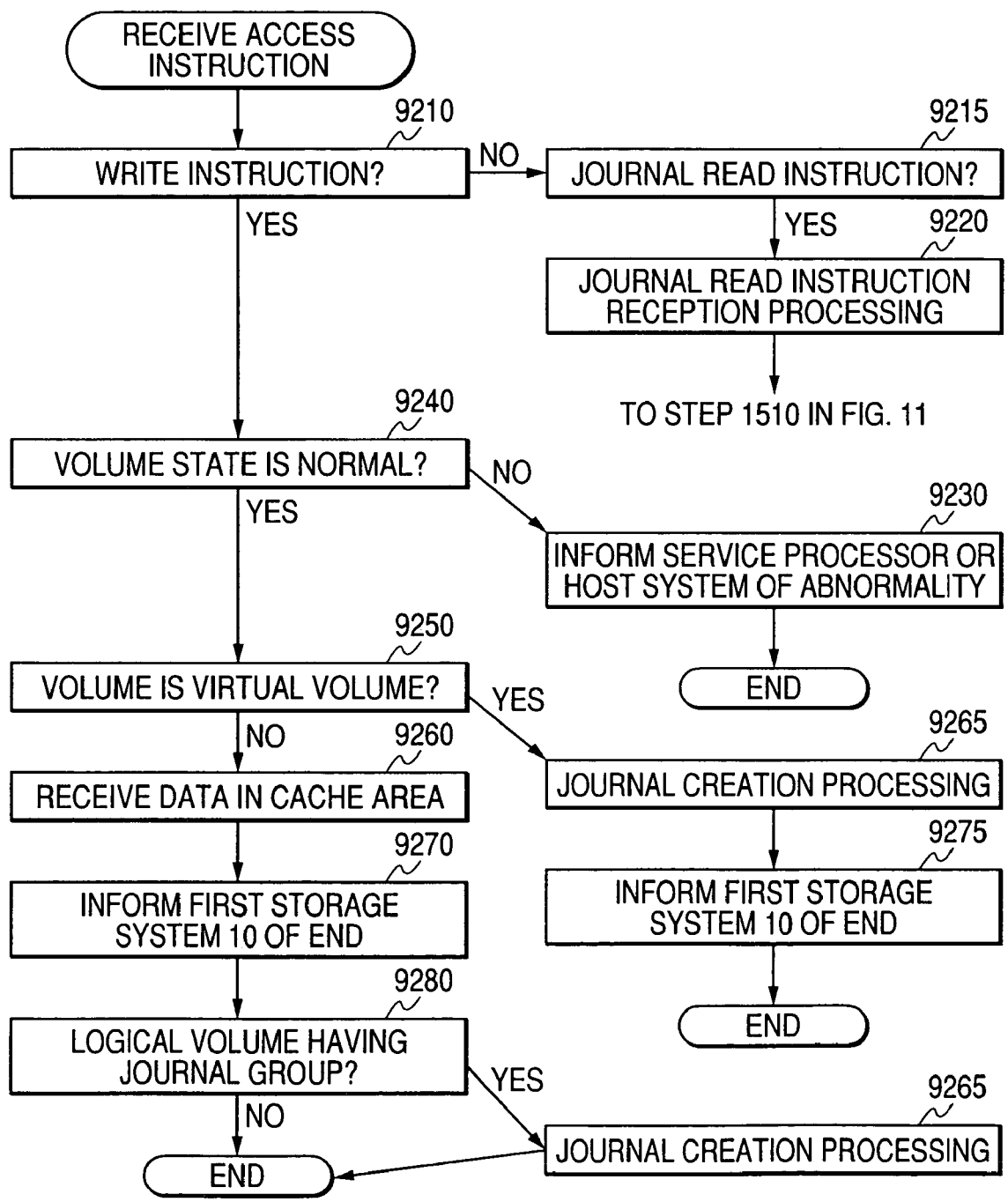
FIG. 18 is a flowchart showing the access instruction reception processing in the second embodiment.

Next, a second embodiment of the present invention will be explained. FIG. 14 is a block diagram for explaining a concept of the second embodiment. The second embodiment is different from the first embodiment in that the logical volume 150 (Data1) of the second storage system is a volume, which is virtually set, and does not have a storage area for actually accumulating data. FIG. 15 is a flowchart showing an initial setting procedure. FIG. 16 is a diagram showing a pair information table for realizing the second embodiment. FIG. 17 is a block diagram showing a flow of data in access instruction reception processing in this embodiment. FIG. 18 is a flowchart showing processing of the second storage system 15 in the second embodiment. The second embodiment will be hereinafter explained with reference to FIGS. 15, 16, 17, and 18.

First, the flowchart shown in FIG. 15 shows the initial setting procedure in the second embodiment. A user sets a journal group for the third storage system 20 using GUIs (graphical user interfaces) included in the host computers 5, 6, and 7 or maintenance terminals not shown in FIG. 14 (step 3000). More specifically, the user writes the logical volume 200 (Data2) and the logical volume 201 (JNL2) in the journal group setting information table as shown in FIG. 7.

Next, the user designates information indicating a data copy object and information indicating a data copy destination and performs pair setting using the maintenance terminals or the host computers 5, 6, and 7 connected to the respective storage system (step 3100). More specifically, the user sets a pair relation between the logical volume 110 (ORG1) and the logical volume 200 (Data2) in FIG. 14.

In this step 3100, the user designates the logical volume 110 (ORG1) and the logical volume 200 (Data2) to form a pair and performs initial copy. This is for giving an identical image data to the logical volume 110 (ORG1) and the logical volume 200 (Data2). Then, the pair is deleted after the initial copy processing ends (step 3200).

Next, the user sets a pair relation between the logical volume 110 (ORG1) and the logical volume 150 (Data1) in the first storage system 10 and the second storage system 15 (step 3300).

FIG. 16 shows a pair information table 510 in the second embodiment. A structure of the pair information table 510 is substantially the same as that shown in FIG. 6 but is different in that data indicating whether a pair is virtualized is retained for each pair. In a pair indicated by a pair number 1 in FIG. 16, a column of virtualization is ON. This indicates that a secondary logical volume of the pair is virtualized.

The user registers the logical volume 150 (Data1) and the logical volume 151 (JNL1) as a journal group (step 3400).

The above is the procedure for the initial setting in the second embodiment. After this initialization processing, accurate restore processing (recovery) for data in the storage system 20 becomes possible.

Next, FIG. 17 will be explained. Upon receiving a write command for data from the host computer 5, the first storage system 10 shown in FIG. 17 writes the data in the designated logical volume 110 (ORG1) (arrow 250 shown in FIG. 17).

When the data is written in the logical volume 110 (ORG1), if there is a logical volume of the other storage system (in this embodiment, the logical volume (Data1) of the second storage system 15) forming a pair with this logical volume 110 (ORG1), the first storage system 10 issues the write command for the data, which is the same as the write command received from the host computer 5, to the second storage system. This write command is received by a channel adapter 54 in the second storage system, and instruction reception processing 310 is performed by a processor on the channel adapter 54.

In the first embodiment, that is, when the logical volume 150 (Data1) in the second storage system 15 has an entity, in this instruction reception processing 310, the processor analyzes the write command, stores write data in an area on a cache memory corresponding to a write destination of a designated logical volume, and accumulates update information on a cache memory corresponding to an area where the journal volume 151 (JNL1), in which the update information is written, is written. The disk adapter 80 performs processing for writing data on the cache memory in a logical volume area corresponding thereto according to circumstances.

On the other hand, in the second embodiment, first, the second storage system 15 judges whether the logical volume 150 (Data1) in the second storage system 15 designated as a write destination is a logical volume, which should be treated as one having an entity, with reference to the pair information table 510 shown in FIG. 16. The second storage system 15 recognizes that the logical volume (Data1) 150 in the second storage system 15 (itself) is a virtualized logical volume. Since the second storage system 15 treats this logical volume (Data1) 150 as one not having an entity, the second storage system 15 accumulates write data in a cache area corresponding to the write data area of the logical volume (JNL1) 151, and accumulates information concerning to which area of theological volume (Data1) 150 the write instruction is applied as update information in a cache area corresponding to the update information area of the logical volume (JNL1) 151 (arrows 1111 and 1120 shown in FIG. 17). The disk adapter 80 writes data on the HDD 100 in which a logical volume corresponding to the data on the cache memory is defined (arrows 1130 and 1140 in FIG. 17).

The access instruction reception processing will be further explained with reference to FIG. 18. Upon receiving an access instruction, first, the channel adapter 54 in the second storage system 15 confirms whether the instruction is a write instruction (step 9210). If the instruction is not a write instruction, for example, if the instruction is an instruction such as a journal read instruction, the channel adapter 54 performs processing of the instruction (steps 9215 and 9220).

Next, the channel adapter 54 judges whether a volume, for which the write instruction has been received, is a normal volume (step 9240). If the volume state is not normal, the channel adapter 54 informs abnormality to a host apparatus, which has issued the instruction, via the maintenance terminal and ends the processing (step 9230). Next, the channel adapter 54 judges whether the logical volume, which is a write destination, is a virtual volume using the pair information tale 510 in FIG. 16 (step 9250). If the logical volume is a virtual volume, the channel adapter 54 performs journal creation processing (step 9265) and, after completing the processing, informs the host apparatus (first storage system) of the end of the processing (step 9275).

If the logical volume is not a virtual volume, the channel adapter 54 receives data in a cache area corresponding to the logical volume (step 9260) and informs the host apparatus of the end of the data reception (step 9270). Next, the channel adapter 54 judges whether the logical volume is a logical volume having a journal group (step 9280). If the logical volume is a logical volume having a journal group, the channel adapter 54 performs journal creation processing (step 9265).

In this way, since the pair information table 510 also includes virtualization information indicating whether a secondary logical volume is virtualized, actual writing of data in the secondary logical volume can be controlled. This makes it possible to define the secondary logical volume as a destination of remote copy without giving a substantial storage capacity to the secondary logical volume.

Third Embodiment

Next, a third embodiment of the present invention will be explained. In the third embodiment, a constitution for making this virtualized secondary logical volume available for other applications will be explained.

Figure 19:
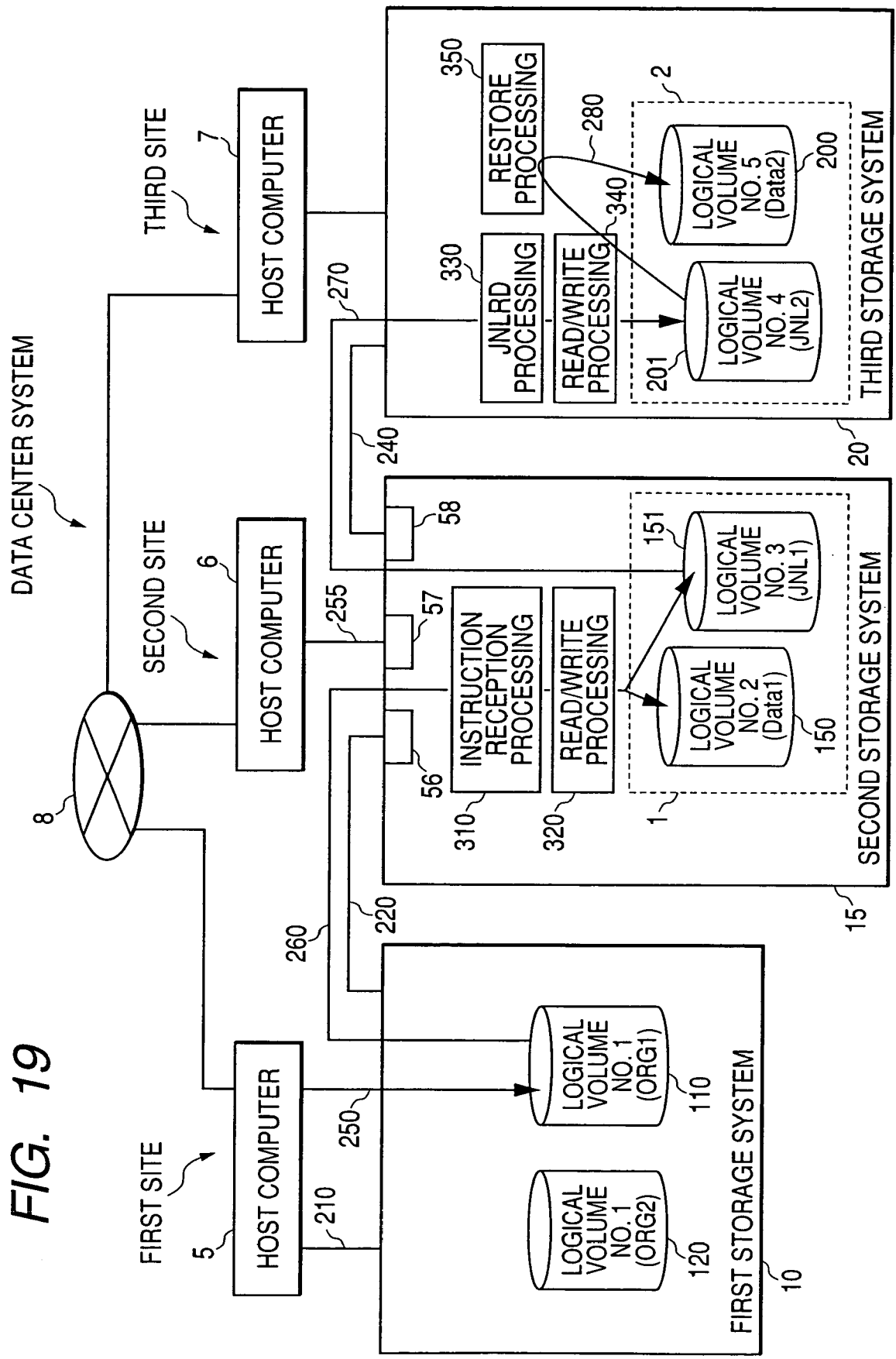
FIG. 19 is a block diagram showing a third embodiment of the present invention.

FIG. 19 is a diagram showing the third embodiment conceptually. Differences from the second embodiment shown in FIG. 14 will be explained in detail. In FIG. 19, for convenience of explanation, a channel adapter 56 for receiving a write instruction for data, a channel adapter 57 connected to the host computer 6 via a connection line 255, and a channel adapter 58 connected to the third storage system 20 are clearly shown with the first storage system 10 as a host apparatus. It is needless to mention that channel adapters are also present in FIGS. 1 and 14. The logical volume (Data1) 110 in the first storage system forms a remote copy pair with the logical volume 150 (Data1) in the second storage system 15, and as in the second embodiment, the logical volume 150 (Data1) is virtualized. Copying of data from this logical volume 150 (Data1) to the logical volume 200 (Data2) in the third storage system is as explained in the second embodiment.

In the third embodiment, the logical volume 150 (Data1) is further connected to the host computer 6 via the channel adapter 57. Then, the third embodiment is particularly characterized by making it possible to write data from the host computer 6 to the logical volume 150 (Data1).

Next, it will be explained how configuration information on the shared memory 70 for making it possible to use the logical volume 150 (Data1) in the host computer 6 is held. The configuration information includes, in addition to the above-mentioned tables (FIGS. 3, 7, and 16), a channel adapter connection information table 5000 that indicates a connection relation among channel adapters and host apparatuses.

Upon receiving an access request (read/write request for data) from a host apparatus, a process or on each of the respective channel adapters in the second storage system 15 judges a host apparatus or another channel adapter, which is connected to the channel adapter, with reference to the connection information table 5000 in FIG. 20. When another storage system or a channel adapter of another storage system is set as the host apparatus, the channel adapter in the second storage system 15 judges that remote copy will be performed, and judges whether a logical volume set as a write destination of the remote copy is virtualized in accordance with the procedure explained in the second embodiment. If the logical volume set as a write object is not virtualized, the channel adapter performs write processing. On the other hand, if the logical volume is virtualized, the channel adapter performs only writing in a journal volume as explained in the second embodiment.

If it is judged that the host apparatus connected to the channel adapter is not another storage system (or a channel adapter in the storage system), the channel adapter executes write processing for writing data in the logical volume set as a write object. The channel adapter performs this processing by writing data in a cache area corresponding to the logical volume set as the write object and writes the data in a logical volume, for which a disk adapter is defined on the HDD 100, asynchronously to the writing in the cache area. In this way, the storage system judges whether data, for which I/O (access request) is received, may be written in a designated logical volume.

Since the storage system can only judge whether a logical volume is virtualized, the storage system cannot judge whether the data may be actually written in the volume. Thus, the storage system identifies data from a host apparatus that may actually be written according to which adapter receives the data. Consequently, the storage system can use a logical volume that is virtualized by another host apparatus.

Note that, as another method, when an identifier indicating remote copy data is present in a data set transferred in remote copy, writing of data in a virtualized volume may be restricted only in the case of remote copy using the identifier.

In the present invention, a case in which it is effective to virtualize a volume is explained with remote copy as an example. However, it is also possible to virtualize a logical volume set as an object of a function other than the remote copy, for example, an E-COPY command, which is a standard command of SCSI.

Note that it is needless to mention that, in FIG. 14, the instruction reception processing and the read/write processing 320 are performed in the channel adapters 56, 57, and 58. In addition, it is also possible to allocate this processing to other processors.

Fourth Embodiment

Next, a fourth embodiment of the present invention will be explained. FIG. 21 shows an example of a setting screen for remote copy pair generation that is displayed on the host computer 5 or the maintenance terminal. In the example of FIG. 21, a user has set Vol#1 and Vol#2 as a pair in a pair volume designation display section 4100 in an area 4600, in which setting for pair generation is performed, on a screen 4000. In performing the setting for pair generation, the user can choose whether to virtualize Vol#2, which corresponds to a secondary logical volume, in a virtual Vol designation display section 4300 in the area 4600 in which setting for pair generation is performed. In the example of FIG. 21, the user has chosen to virtualize the Vol#2 corresponding to a secondary logical volume.

There is a connection setting section 4400 in an area 4700 that indicates to which storage system or host apparatus each channel adapter in each storage system is connected. This connection setting unit 4400 makes it possible to set a connection relation between each channel adapter and storage system. Note that a connection destination of the channel adapter may be a channel adapter of anther storage system or host apparatus.

An example of a screen of the connection setting section 4400 indicates that the channel adapters 56, 57, and 58 are connected to the first storage system 10, the host computer 5, and the third storage system 20, respectively.

Moreover, as shown in FIG. 21, there is a logical volume use setting section 4500 in an area 4800 showing volumes used by host apparatuses. This logical volume use setting section 4500 makes it possible to set a logical volume that is used by each host computer. In an example of a screen of the logical volume use setting section 4500, the logical volume 150 is set as being used by the host computer 6. It should be noted here that, since the logical volume 150 is already used by the host computer 6, if the logical volume 150 is designated as the Vol#2 in the pair volume designation display section 4100, a pair cannot be designated unless virtualization is set for the logical volume 150.

As described above, the user chooses not to virtualize the logical volume 150 (Data1) in the second storage system 15 when the user attaches importance to safety and failure resistance property, and chooses to virtualize the logical volume 15 (Data1) when the user wishes to utilize a volume capacity in the second storage system 15 as much as possible. This makes it possible to establish a system according to a purpose and cost. Note that a procedure for copying data from the first storage system 10 to the third storage system 20 after virtualizing the same is as explained in the second embodiment.

Fifth Embodiment

Next, as a fifth embodiment of the present invention, a case will be explained in which, when a failure has occurred in the first storage system 10, a job is continued in the third storage system 20 located a long distance apart from the first storage system 10 (failover).

Figure 22:
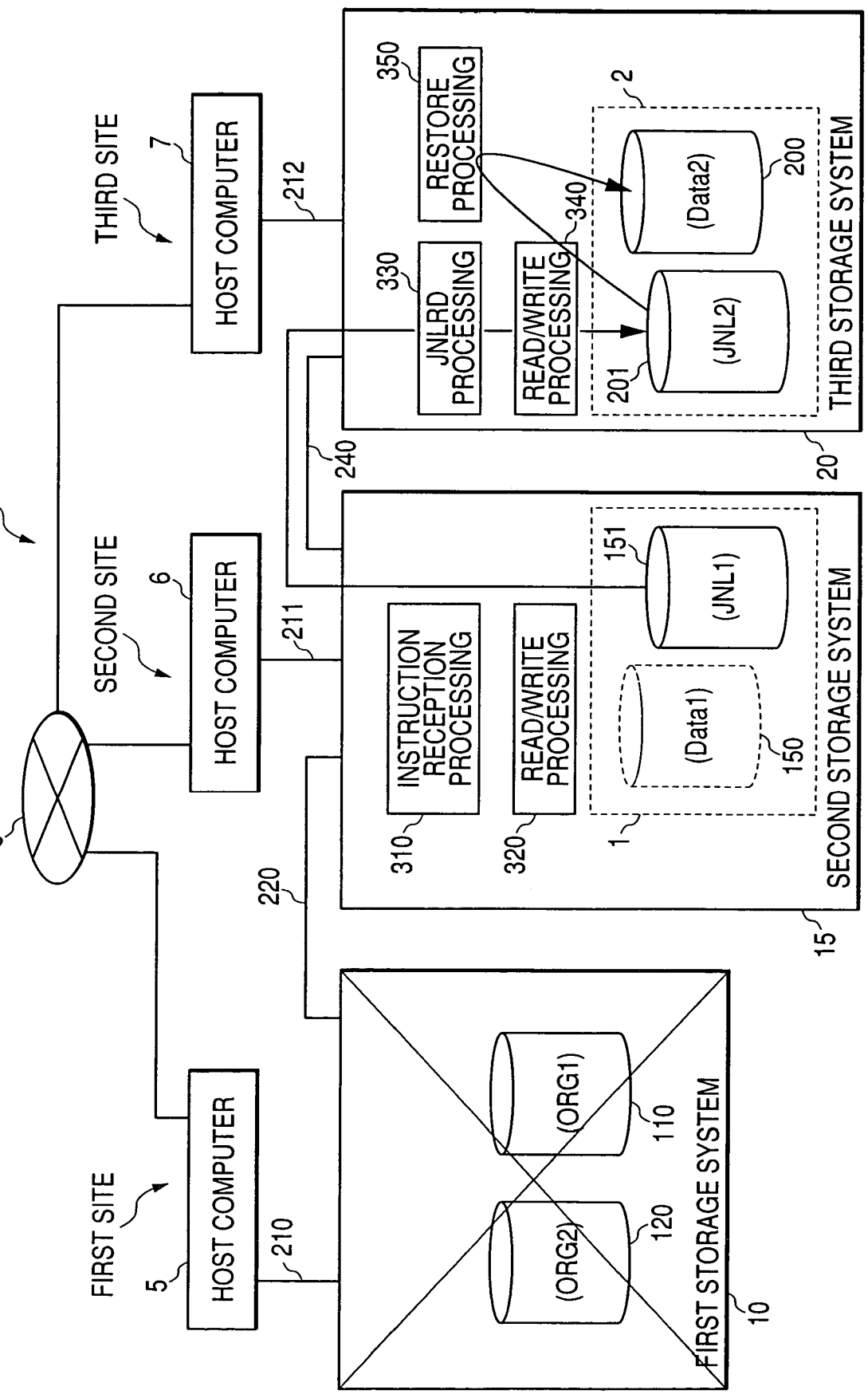
FIG. 22 is a block diagram showing a case in which a job is taken over by a third site when a failure has occurred in a first site.

As shown in FIG. 22, the first storage system 10, the host computer 5, the third storage system 20 located a long distance apart from the first storage system 10, the second storage system 15 interposed between the first storage system 10 and the host computer 5, the host computer 6, and the host computer 7 connected to the third storage system 20 are connected by connection lines. In the event that some failure has occurred in the first storage system, in taking over a job of the first storage system 10 in the third storage system 20 located a long distance apart from the first storage system 10, it is a problem in that the logical volume 110 (ORG1) retained by the first storage system 10 and the logical volume 200 (Data2) retained by the third storage system 20 are not the same data. Since the first storage system 10 and the second storage system 15 are synchronous but the second storage system 15 and the third storage system 20 are asynchronous, a copy of copy object data in the first storage system 10 is not completely created in the third storage system 20 (data, which has not reached, is not reflected on the logical volume 200 (Data2).

Thus, in order to resume the job in the third storage system 20, first, the data, which has not reached, is reflected on the logical volume 200 (Data2). In the second and third embodiments and the fourth embodiment in which a user has chosen to virtualize a logical volume, the second storage system 15 does not include the logical volume 150 (Data1), but journal data is present in the journal volume 151 (JNL1). Thus, the journal data is sent to the third storage system 20 to reflect the data, which has not reached, on the logical volume 200 (Data2) according to the restore processing 350 shown in FIG. 22. Consequently, a complete copy of the copy object data can be created in the logical volume 200 (Data2) in the third storage system 20. Thereafter, the third storage system 20 can receive an instruction from the host computer 7.

As a result, resistance against a failure can be kept while virtualizing the logical volume 150 (Data1) in the second storage system to reduce a volume capacity.

Sixth Embodiment

Figure 23:
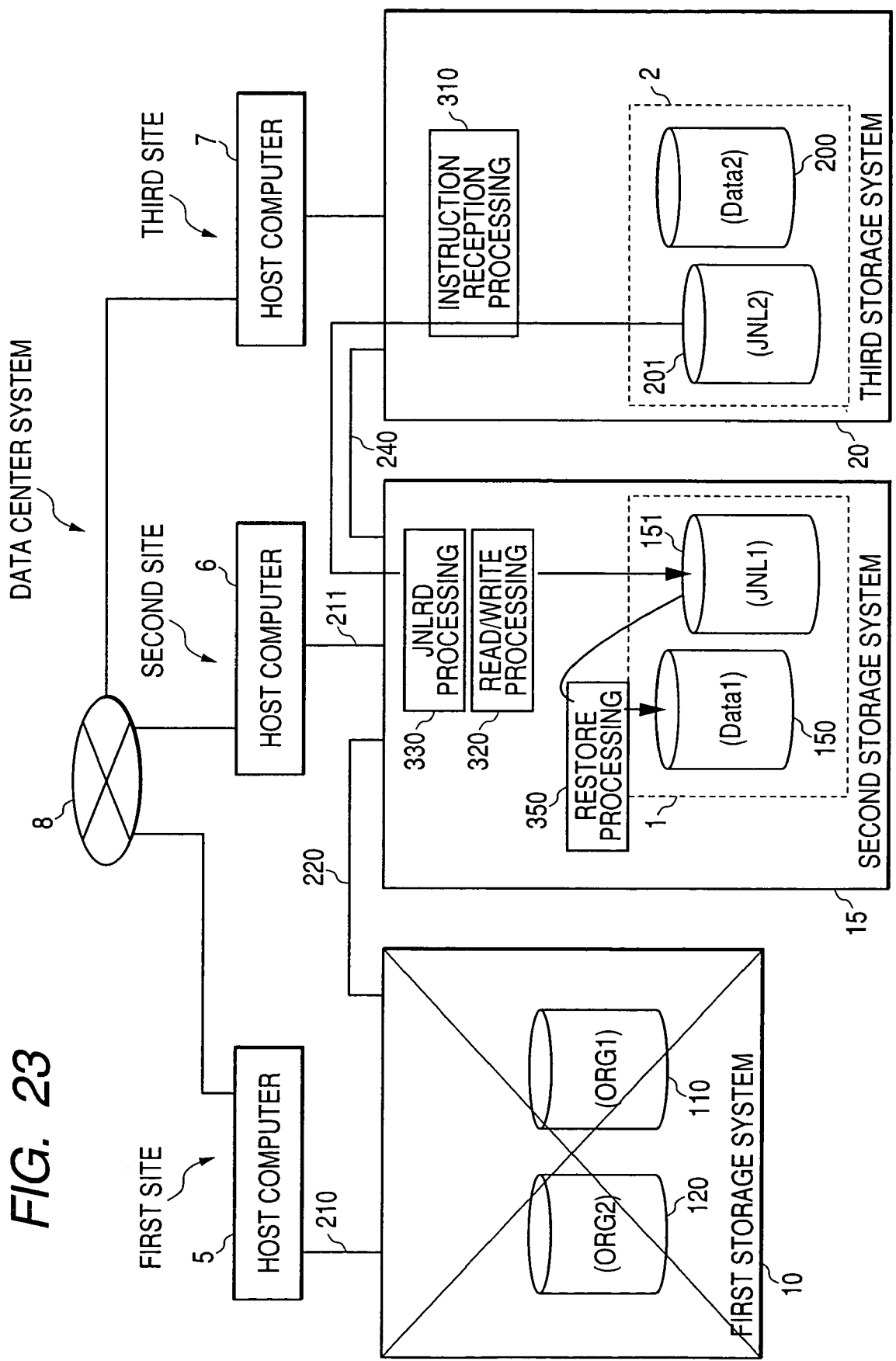
FIG. 23 is a block diagram showing a case in which a job is taken over by a second site when a failure has occurred in the first site.

In addition, as a sixth embodiment, as shown in FIG. 23, if it is desired to continue a jog in the second storage system 15, since the logical volume 150 (Data1) in the second storage system 15 is virtualized, it is necessary to assign a logical volume to the second storage system 15 anew. After assigning the logical volume to the second storage system 15, journal data is acquired from the third storage system 20 according to the journal read processing 330 to perform the restore processing 350 in the second storage system 15.

Consequently, a copy of a copy source logical volume in the first storage system 10 can be created in the logical volume assigned to the second storage system 15 anew. Thereafter, the second storage system 15 can receive an instruction from the host computer 6.

The present invention has been explained specifically on the basis of the embodiments. However, it is needless to mention that the present invention is not limited by the embodiments, and various modifications are possible within a range not departing from the scope of the present invention.

I claim:

1. A remote copy system comprising:
    a first storage system having a first storage control unit for controlling data writing in a first logical volume with reference to a first shared memory; and
    a second storage system having a second storage control unit for controlling data writing in a second logical volume with reference to a second shared memory,
    wherein the remote copy system stores pair information defining a correspondence relationship between the first logical volume and the second logical volume, in the first shared memory, and information, which, when data is written in the second logical volume, defines a journal volume storing the data and update information of the data, in the second shared memory;
    wherein when first data is written in the first logical volume, the first storage system issues a write instruction for the first data to the second storage control unit with the second logical volume as an object of writing on the basis of the pair information in the first shared memory, and
    wherein when a write instruction to write data in the second logical volume is received from the first storage system, with reference to the second shared memory, the second storage system does not write the first data in the second logical volume, but instead writes the first data and update information of the first data in the journal volume if an area defined as the second logical volume is defined as a logical volume area other than the second logical volume, and writes the first data in the second logical volume if the area defined as the second logical volume is not defined as a logical volume other than the second logical volume.

2. A remote copy system comprising:
    a first storage system coupled to an information processing apparatus and sends and receives data to and from the information processing apparatus;
    a second storage system coupled to the first storage system and receives data from the first storage system; and
    a third storage system coupled to the second storage system and receives data from the second storage system;
    wherein the first storage system has a first storage area in which the data sent from the information processing apparatus is written,
    wherein the second storage system has a logical address to be a write destination of the data sent from the first storage system, and also has a second storage area in which data, which should be written in the logical address, and update information concerning the data are written, and when a storage area is allocated to the logical address, the data is written in the storage area, and the data and the update information is written in a second storage area;

wherein when a storage area is not allocated to the logical address, the data and the update information is written in the second storage area;

wherein the third storage system has a third storage area in which the data read out from the second storage area in the second storage system and update information concerning the data are stored, and a fourth storage area that is a copy destination of the first storage area; and wherein the data and the update information, which are stored in the second storage area, are read out from the third storage system and written in the third storage area after a predetermined time elapses, and thereafter the second storage area can be opened and is used for new storage.

3. A remote copy system according to claim 2 wherein each of the second and the third storage areas have a smaller storage capacity than either of the first and the fourth storage areas.

4. A remote copy system according to claim 2, wherein the data and the update information stored in the second storage area are sent to the third storage area in order to reflect the data, which has not reached, on the fourth storage area, when a failure occurs in the first storage system.

5. A remote copy system according to claim 2, wherein a logical volume is newly assigned to the second storage system, and the date and the update information are acquired from the third storage area in order to create, in the logical volume newly assigned to the second storage system, a copy of a copy source logical volume in the first storage system, when a failure occurs in the first storage system.

6. A remote copy system comprising:

a first storage system coupled to a first information processing apparatus to send data to and receive data from the first information processing apparatus;

a second storage system coupled to a second information processing apparatus and coupled to the first storage system to send data to and receive data from the second information processing apparatus, and to receive data from the first storage system; and a third storage system coupled to the second storage system to receive data from the second storage system;

wherein the first storage system includes a first storage area in which the data sent from the information processing apparatus is written;

wherein the second storage system includes a logical address as a write destination of data sent from the first storage system, and includes a second storage area in which data targeted for the logical address, and update information concerning the data, are written;

wherein the third storage system includes a third storage area in which data received from the second storage area in the second storage system and update information concerning the data are stored, and includes a fourth storage area that is a copy destination of the first storage area; and wherein data sent from the first storage system so as to be written to the logical address in the second storage system, is written in the second storage area together with update information, and a storage area for sending and receiving data to and from the second information processing apparatus is allocated to the logical address, and the data and the update information to be stored in the second storage area are read out from the third storage system and written in the third storage area, and thereafter the second storage area can be opened and used for additional storage.

7. A remote copy system according to claim 6, wherein the second and the third storage areas are smaller than the first and the fourth storage areas.

8. A remote copy system according to claim 6, wherein the data and the update information stored in the second storage area are sent to the third storage area in order to reflect the data, which has not reached, on the fourth storage area, when a failure occurs in the first storage system.

9. A remote copy system according to claim 6, wherein a logical volume is newly assigned to the second storage system, and the date and the update information are acquired from the third storage area in order to create, in the logical volume newly assigned to the second storage system, a copy of a copy source logical volume in the first storage system, when a failure occurs in the first storage system.

* * * * *